United States Patent
Iwai et al.

(10) Patent No.: US 9,261,041 B2
(45) Date of Patent: *Feb. 16, 2016

(54) SPARK-IGNITION DIRECT INJECTION ENGINE

(71) Applicant: Mazda Motor Corporation, Aki-gun, Hiroshima (JP)

(72) Inventors: Kouhei Iwai, Hiroshima (JP); Masahisa Yamakawa, Hiroshima (JP); Kazuhiro Nagatsu, Hiroshima (JP); Takashi Youso, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 215 days.

This patent is subject to a terminal disclaimer.

(21) Appl. No.: 13/954,881

(22) Filed: Jul. 30, 2013

(65) Prior Publication Data

US 2014/0060489 A1    Mar. 6, 2014

(30) Foreign Application Priority Data

Aug. 29, 2012    (JP) .................................. 2012-188736

(51) Int. Cl.
*F02P 5/00*    (2006.01)
*F02D 41/30*    (2006.01)
(Continued)

(52) U.S. Cl.
CPC .............. *F02D 41/30* (2013.01); *F02B 23/101* (2013.01); *F02B 29/0418* (2013.01); *F02D 9/04* (2013.01); *F02D 13/0207* (2013.01); *F02D 13/0219* (2013.01); *F02D 13/0273* (2013.01); *F02D 41/0057* (2013.01); *F02D 41/3017* (2013.01); *F02M 25/0728* (2013.01); *F02M 25/0752* (2013.01); *F02M 25/0754* (2013.01); *Y02T 10/125* (2013.01); *Y02T 10/146* (2013.01); *Y02T 10/18* (2013.01); *Y02T 10/47* (2013.01)

(58) Field of Classification Search
CPC . F02D 41/401; F02D 41/402; F02D 41/3035; F02D 41/0057; F02D 204/001; F02M 25/0728; F02M 25/0752; F02B 23/101
USPC ............... 123/434, 478, 480, 568.11, 568.12, 123/568.21, 568.31
See application file for complete search history.

(56) References Cited

U.S. PATENT DOCUMENTS 8,838,364 B2 * 9/2014 Nagatsu et al. ............... 701/104
2003/0056752 A1 * 3/2003 Sukegawa et al. ............ 123/305
(Continued)

FOREIGN PATENT DOCUMENTS

JP    2007154859 A    6/2007
JP    2009197740 A    9/2009

*Primary Examiner* — John Kwon
(74) *Attorney, Agent, or Firm* — Alleman Hall McCoy Russell & Tuttle LLP

(57) ABSTRACT

A spark-ignition direct injection engine is provided. The engine includes an engine body, a fuel injection valve, a fuel pressure setting mechanism, an ignition plug, and a controller. The controller operates the engine to perform compression-ignition combustion within a first operating range, and controls the ignition plug to operate the engine to perform spark-ignition combustion within a second operating range. Within a specific part of the first range, the controller sets the fuel pressure to 30 MPa or above, and retards the compression ignition to after a compression top dead center by controlling the injection valve to inject fuel into a cylinder in a period from a late stage of compression stroke to an early stage of expansion stroke. Below the specific part, the controller controls the fuel injection valve to inject the fuel into the cylinder in a period from intake stroke to a mid-stage of the compression stroke.

8 Claims, 18 Drawing Sheets

(51) Int. Cl.
*F02D 41/00* (2006.01)
*F02B 23/10* (2006.01)
*F02B 29/04* (2006.01)
*F02M 25/07* (2006.01)
*F02D 9/04* (2006.01)
*F02D 13/02* (2006.01)

(56) References Cited

U.S. PATENT DOCUMENTS

2012/0216774 A1* 8/2012 Oba et al. ............... 123/305
2014/0060490 A1* 3/2014 Iwai et al. ............... 123/478
2014/0060493 A1* 3/2014 Iwai et al. ............... 123/478
2014/0069382 A1* 3/2014 Iwai et al. ............ 123/406.47

* cited by examiner

SPARK-IGNITION DIRECT INJECTION ENGINE

BACKGROUND

The present invention relates to a spark-ignition direct injection engine.

Techniques for improving both an exhaust emission performance and a thermal efficiency have been known. For example, JP2007-154859A discloses such a technique using a combustion mode of compression to ignite mixture gas inside the cylinder. With engines where such compression-ignition combustion is performed, the compression-ignition combustion becomes combustion with a significant increase in pressure as the engine load increases, causing an increase of combustion noises. Thus, as disclosed in JP2007-154859A, even for the engines which perform compression-ignition combustion, within an operating range on a high engine load side, instead of the compression-ignition combustion, spark-ignition combustion by the operation of the ignition plug has generally been performed.

JP2009-197740A discloses an engine which performs compression-ignition combustion within a low engine load operating range with low engine speed similar to the engine disclosed in JP2007-154859A, in which the open timing of an intake valve is advanced within a part of the compression-ignition combustion performing range where the engine load is relatively high and the engine speed is relatively high so that burned gas inside the cylinder is blown back to the intake port side once and then the burned gas is introduced into the cylinder again along with fresh air. In this manner, the temperature of the burned gas decreases because of the fresh air. Thus, the temperature inside the cylinder deceases and the significant pressure increase due to the compression-ignition combustion can be suppressed. The art disclosed in JP2009-197740A is advantageous in expanding the range where the compression-ignition combustion is performed to the higher engine load side.

With engines which perform compression-ignition combustion, it has been desired to expand the range where the compression-ignition combustion is performed, the compression-ignition combustion being advantageous regarding the exhaust emission performance and thermal efficiency. However, as described above, the compression-ignition combustion becomes combustion with a significant increase in pressure (dP/dt) as the engine load increases, and because of the restriction of NVH (Noise Vibration Harshness), it is difficult to expand the compression-ignition combustion performing range to the higher engine load side.

SUMMARY

The present invention is made in view of the above situations and expands an operating range where compression-ignition combustion is performed to the higher engine load side.

The present invention aims to avoid a rapid increase of pressure inside a cylinder within a range where an engine load is comparatively high by performing the compression-ignition combustion in an expansion stroke period. In order to achieve such combustion, a characteristic fuel injection mode is adopted, which increases a pressure of fuel to be injected and retards a timing of injecting the fuel into a cylinder to near a compression top dead center (CTDC). This characteristic fuel injection mode improves an ignitability of compression ignition as well as stabilizes the compression-ignition combustion during the expansion stroke period.

Specifically, a spark-ignition direct injection engine is provided. The engine includes an engine body having a cylinder, a fuel injection valve for injecting fuel into the cylinder, a fuel pressure setting mechanism for setting a pressure of the fuel to be injected by the fuel injection valve, an ignition plug arranged to be oriented toward the inside of the cylinder and for igniting mixture gas within the cylinder, and a controller for operating the engine body by controlling at least the fuel injection valve, the fuel pressure setting mechanism, and the ignition plug.

When an operating state of the engine body is within a first range that is a predetermined low engine load range, the controller operates the engine body to perform compression-ignition combustion where the mixture gas within the cylinder is compressed to ignite. When the operating state of the engine body is within a second range where the engine load is higher than the first range where the compression-ignition combustion is performed, the controller controls the ignition plug at a predetermined timing so as to operate the engine body to perform spark-ignition combustion.

Further, when the operating state of the engine body is within a specific high engine load part within the first range including the boundary between the first and second ranges, the controller sets the fuel pressure to be a high fuel pressure of 30 MPa or above by the fuel pressure setting mechanism, and the controller retards the compression ignition to after a compression top dead center by controlling the fuel injection valve to perform the fuel injection into the cylinder at least in a period from a late stage of compression stroke to an early stage of expansion stroke. When the operating state of the engine body is within a part of the first range where the engine load is below the specific part, the controller controls the fuel injection valve to perform the fuel injection into the cylinder at least in a period from intake stroke to a middle stage of the compression stroke.

Here, "the late stage of the compression stroke" and "the middle stage of the compression stroke" may be the late stage and the middle stage of the compression stroke when the compression stroke is divided into three periods of early stage, middle stage, and late stage; and similarly, "the early stage of the compression stroke" may be the early stage of the compression stroke when the compression stroke is divided into three periods of early stage, middle stage, and late stage.

According to this configuration, when the operating state of the engine body is within the first range with a relatively low engine load, the engine body is operated by the compression-ignition combustion where the mixture gas within the cylinder is compressed to ignite. Specifically, within the relatively low engine load part of the first range, the fuel is injected into the cylinder at least in the period from the intake stroke to the middle stage of the compression stroke. Note that, the fuel pressure may be the high fuel pressure of 30 MPa or above as described later; however, when the fuel injection is performed in the period from the intake stroke to the middle stage of the compression stroke, it is unnecessary to set the high fuel pressure. This is because, since the fuel injection is performed at a comparatively early stage and at a timing where the air flow inside the cylinder is comparatively strong, a homogeneous mixture gas is formed and it is surely compressed to ignite near the CTDC and stably combusts. Note that, the fuel injection can be split, and in this case, at least one of the plurality of split fuel injections needs to be performed in the period from the intake stroke to the middle stage of the compression stroke.

In contrast, within a relatively high engine load part of the first range (specifically, a range including the boundary between the first range where the compression-ignition combustion is performed and the second range where the spark-ignition combustion is performed), the fuel pressure is set to the high fuel pressure of 30 MPa or above, and the fuel is injected into the cylinder in the period from the late stage of the compression stroke to the early stage of the expansion stroke.

By comparatively increasing the fuel pressure, an injection amount that is injected per unit time increases. When comparing the pressures at the same fuel injection amount, the higher fuel pressure shortens the period of injecting fuel into the cylinder (i.e., injection period). This is advantageous in comparatively shortening the time from a start of the fuel injection to the compression ignition.

Further, the high fuel pressure is advantageous in atomizing a spray of the fuel to be injected into the cylinder, and along with injecting the fuel into the cylinder at the high fuel pressure, a turbulence inside the cylinder near the CTDC is increased, and the turbulence energy inside the cylinder is increased. These factors improve mixing characteristics of the fuel inside the cylinder near the CTDC, and a comparatively homogeneous combustible mixture gas can be formed in a short period of time.

Since the fuel is injected into the cylinder at least in the late period from the late stage of the compression stroke to the early stage of the expansion stroke as described above, a pre-ignition is avoided. Along with this, as described above, the comparatively homogeneous mixture gas formed by injecting the fuel at a high fuel pressure is surely compressed to ignite after the CTDC, and stably combusts in the expansion stroke period. Because an in-cylinder pressure is gradually lowered on the expansion stroke by motoring, a sharp pressure increase inside the cylinder caused by the combustion is avoided, and the combustion becomes a comparatively slow combustion. On the other hand, since the comparatively homogeneous burnable mixture gas is rapidly formed after starting the fuel injection, at an appropriate timing after the CTDC, the combustible mixture gas is surely compressed to ignite and stably combusts in the expansion stroke period. Note that, the fuel injection may be split injections, and in this case, at least one of the plurality of split fuel injections is performed at the comparatively late period from the late stage of the compression stroke to the early stage of the expansion stroke.

Since the restriction of NVH can be avoided as a result of such a devised fuel injection mode, the above described configuration can expand the first range where the compression-ignition combustion is performed toward the high engine load side.

The spark-ignition direct injection engine may further include an exhaust recirculator for introducing exhaust gas into the cylinder. The controller may control the exhaust recirculator to change an EGR ratio, the EGR ratio corresponding to a ratio of an amount of exhaust gas with respect to the entire gas amount within the cylinder. When the operating state of the engine body is within a lowest engine load part of the first range (alternatively referred to as the "low engine load part of the first range"), the controller may set a highest EGR ratio and reduce the EGR ratio according to an increase of the engine load. Between the specific part of the first range and a low engine load part of the second range including the boundary between the first and second ranges, the controller may continuously reduce the EGR ratio according to the increase of the engine load.

Thus, within the first range where the compression-ignition combustion is performed, when the operating state of the engine body is within the lowest engine load range, the highest EGR ratio is set. The high EGR ratio reduces a pumping loss and improves the fuel consumption. Note that, within the lowest engine load range, as described later, by introducing high-temperature burned gas into the cylinder through, for example, trapping the exhausted gas inside the cylinder or an internal EGR control that re-introduces into the cylinder the exhaust gas discharged to either an intake port or an exhaust port, the ignitability of the compression ignition can be improved and becomes advantageous in stabilizing the compression-ignition combustion.

In the first range, the EGR ratio is decreased according to the engine load increases. The EGR ratio may be reduced in a stepwise fashion (in other words, discontinuously) according to the increase of the engine load, or for example, when an air-fuel ratio of the mixture gas is fixed to a predetermined air-fuel ratio with respect to the increase of the engine load, the EGR ratio may continuously be reduced according to the increase of the engine load. The predetermined air-fuel ratio may be a theoretical air-fuel ratio (air excess ratio of $\lambda \approx 1$), and thus, there is an advantage of being able to use a three-way catalyst. Note that, the predetermined air-fuel ratio is not limited to the theoretical air-fuel ratio. Continuously reducing the EGR ratio while keeping the mixture gas at the predetermined air-fuel ratio according to the increase of the engine load is equivalent to introducing the EGR gas into the cylinder as much as possible, and therefore, this becomes advantageous in reducing the pumping loss.

Within the first range where the EGR ratio is reduced according to the increase of the engine load, within a range from a specific part on a high engine load side to a low engine load side within the second range, where the spark-ignition combustion is performed, the EGR ratio is continuously reduced according to the increase of the engine load. By continuously reducing the EGR ratio across the border between the first range and the second range where the combustion mode switches from the compression-ignition combustion to the spark-ignition combustion, the gas composition inside the cylinder does not rapidly change, and thus, the switching of the combustion mode becomes smooth, and therefore, the occurrence of, for example, torque shock in switching the combustion mode can be suppressed. Especially, because the responsiveness of the exhaust recirculator for introducing the exhaust gas into the cylinder is comparatively low, it is advantageous in improving the controllability.

Further, by continuously introducing the exhaust gas into the cylinder also within the second range where the spark-ignition combustion is performed, it is advantageous in reducing the pumping loss on at least the low engine load side of the second range, and can suppress abnormal combustion such as the pre-ignition and knocking and improve an exhaust emission performance.

The exhaust recirculator may introduce into the cylinder, a cooled EGR gas that is cooled exhaust gas, and a hot EGR gas having a higher temperature than the cooled EGR gas. When the operating state of the engine body is within a low engine load part of the first range, the controller may only introduce the hot EGR gas into the cylinder through the exhaust recirculator, and when the operating state of the engine body is within the low engine load part of the second range including the boundary between the first and second ranges, the controller may at least introduce the cooled EGR gas into the cylinder.

Within the low engine load part of the first range, the temperature at the end of the compression stroke inside the cylinder is increased by introducing only the hot EGR gas into the cylinder, and therefore, the ignitability of the compression ignition improves, and becomes advantageous in stabilizing the compression-injection combustion. The hot EGR gas may be EGR gas introduced into the cylinder by the internal EGR control as described above, or, for example, may be EGR gas recirculated to the intake side by bypassing the EGR cooler for cooling the EGR gas.

On the other hand, as the engine load increases, the temperature inside the cylinder at the end of compression stroke is increased, and the pressure increase of the compression-ignition combustion becomes furious, however, in the above described configuration, in the specific part where the engine load is relatively high within the first range, by at least introducing the cooled EGR gas into the cylinder, the temperature at the end of the compression stroke is prevented from becoming excessively high. This stabilizes the compression-ignition combustion while suppressing the sharp pressure increase inside the cylinder due to the compression-ignition combustion. Note that, in the specific part, both the cooled EGR and the hot EGR may be introduced into the cylinder.

Moreover, even within the low engine load part of the second range where the spark-ignition combustion is performed, by at least introducing the cooled EGR gas into the cylinder, the abnormal combustion such as the pre-ignition and knocking is avoided, and because the combustion temperature is lowered thereby, it is advantageous in suppressing the generation of RawNOx and reducing the cooling loss. Note that, within the low engine load part of the second range, both the cooled EGR and the hot EGR may be introduced into the cylinder.

When the operating state of the engine body is within the part of the first range where the engine load is below the specific part, the controller may set the fuel pressure to be a low fuel pressure of below 30 MPa by the fuel pressure setting mechanism, and the controller may control the fuel injection valve to perform the fuel injection at least in the period from the intake stroke to the middle stage of the compression stroke.

Within the low engine load range, since the fuel injection period is in the early period from the intake stroke to the middle stage of the compression stroke, it is unnecessary to increase the fuel pressure. Therefore, by setting the low fuel pressure, the unnecessary energy for increasing the fuel pressure can be suppressed, and the fuel consumption can be improved according to the suppressed energy.

The fuel pressure setting mechanism may include a high pressure fuel pump that is operated by the engine body, and the high pressure fuel pump may adjust the pressure of the fuel to be injected from the fuel injection valve.

By the fuel pressure being low within the low engine load range, an engine operating force for operating the high pressure fuel pump can be reduced, and the fuel consumption can be improved according to the reduced force.

A piston may be reciprocatably inserted into the cylinder, and a concaved cavity may be formed on a top face of the piston. When the operating state of the engine body is within the specific part of the first range, the controller may control the fuel injection valve to perform the fuel injection into the cylinder at least in the period from the late stage of the compression stroke to the early stage of the expansion stroke so that the fuel is injected into the cavity.

By injecting the fuel into the cavity space at the high fuel pressure, a jet flow generation can be increased when injecting the fuel into the cavity, an air utilization ratio is increased by the increased flow inside the cavity, and the combustion performance can be improved.

The fuel injection valve may be a multi-hole type and may be arranged in a center part of a combustion chamber of the engine body, and the fuel injection valve may be set to radially inject the fuel within the cavity in the period from the late stage of the compression stroke to the early stage of the expansion stroke.

By injecting the fuel into the cavity space at the higher fuel pressure, the jet flow generation can be increased more when injecting the fuel into the cavity, the air utilization ratio is further increased by the increased flow inside the cavity, and the combustion performance can be even more improved.

The exhaust recirculator may introduce into the cylinder, a cooled EGR gas that is cooled exhaust gas, and a hot EGR gas having a higher temperature than the cooled EGR gas. When the operating state of the engine body is between the specific part of the first range and a low engine load part of the second range including the boundary between the first and second ranges, the exhaust recirculator may introduce both the cooled and hot EGR gas into the cylinder and, as the engine load increases, may reduce the EGR ratio by reducing a ratio of the hot EGR gas amount with respect to the entire gas amount within the cylinder while increasing a ratio of the cooled EGR gas with respect to the entire gas amount within the cylinder, the EGR ratio corresponding to the ratio of the total EGR gas amount including the cooled EGR gas and the hot EGR gas with respect to the entire gas amount within the cylinder.

The hot EGR gas ratio is reduced while increasing the cooled EGR gas ratio according to the increase of the engine load. Thus, the gas temperature inside the cylinder can be appropriately adjusted, the compression-self-ignition performance can be secured, the pre-ignition can be suppressed, and the compression-self-ignition combustion can be stabilized.

DETAILED DESCRIPTION OF EMBODIMENTS

Figure 1:
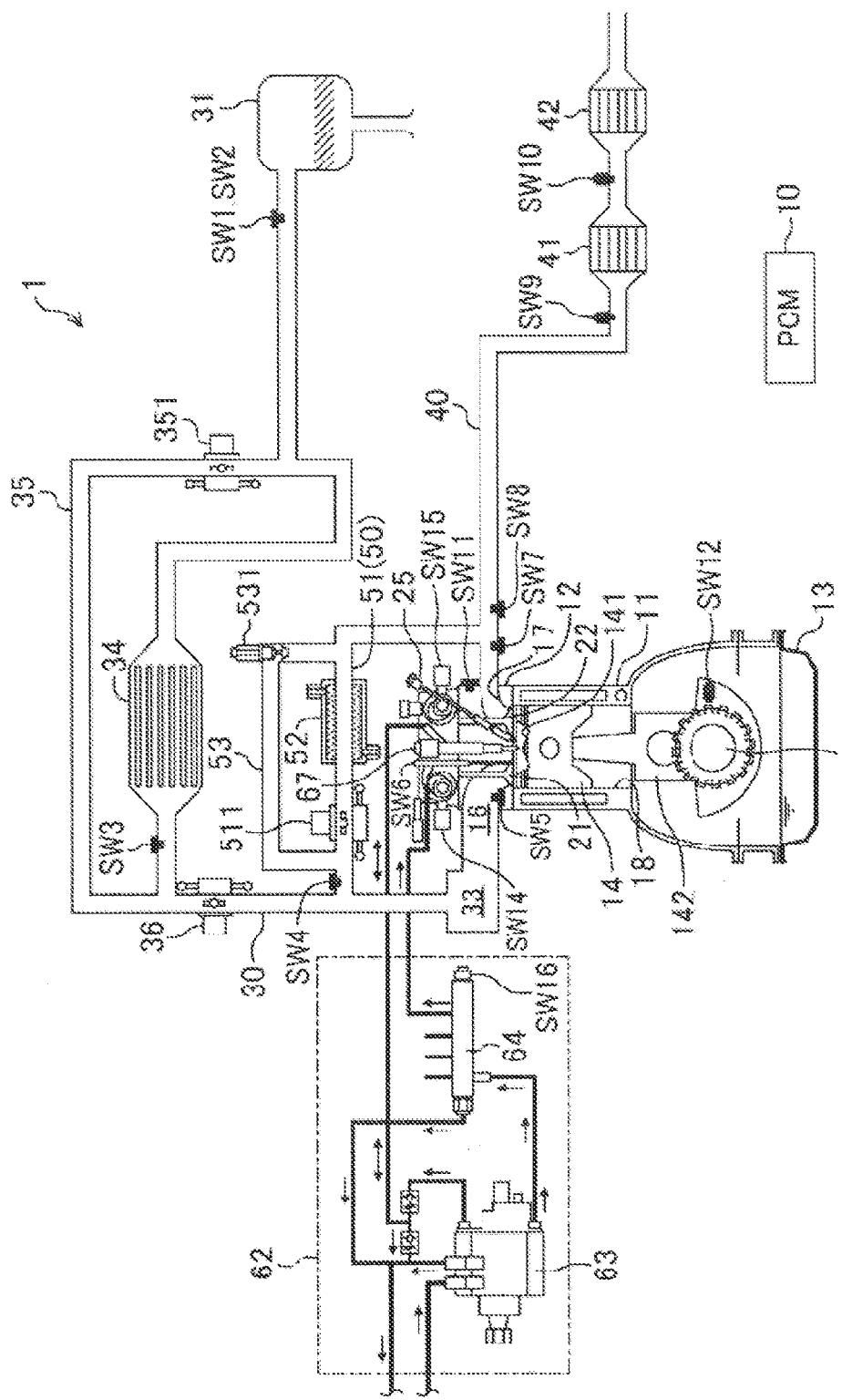
FIG. 1 is a schematic diagram showing a configuration of a spark-ignition direct injection engine.
Figure 2:
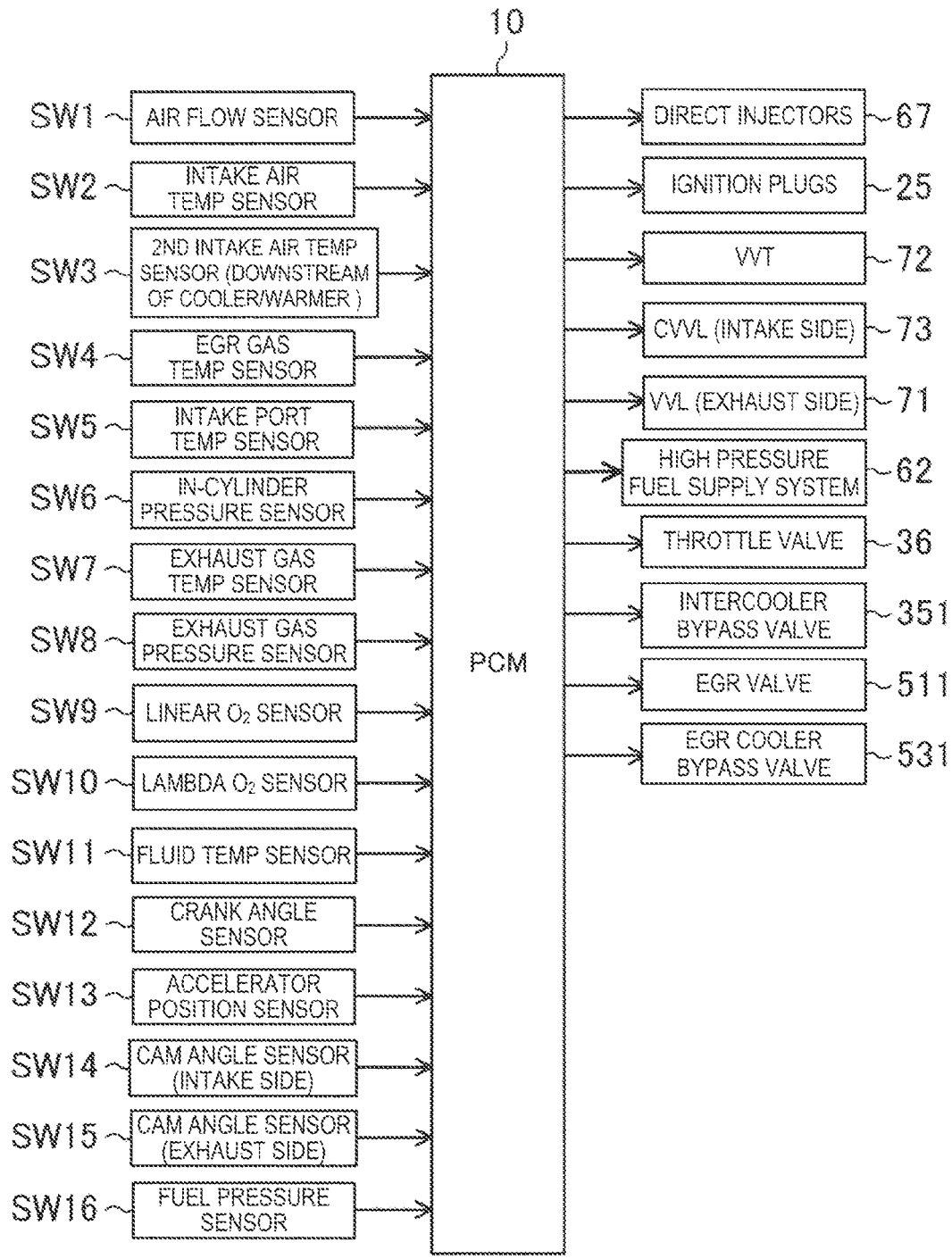
FIG. 2 is a block diagram relating to a control of the spark-ignition direct injection engine.
Figure 3:
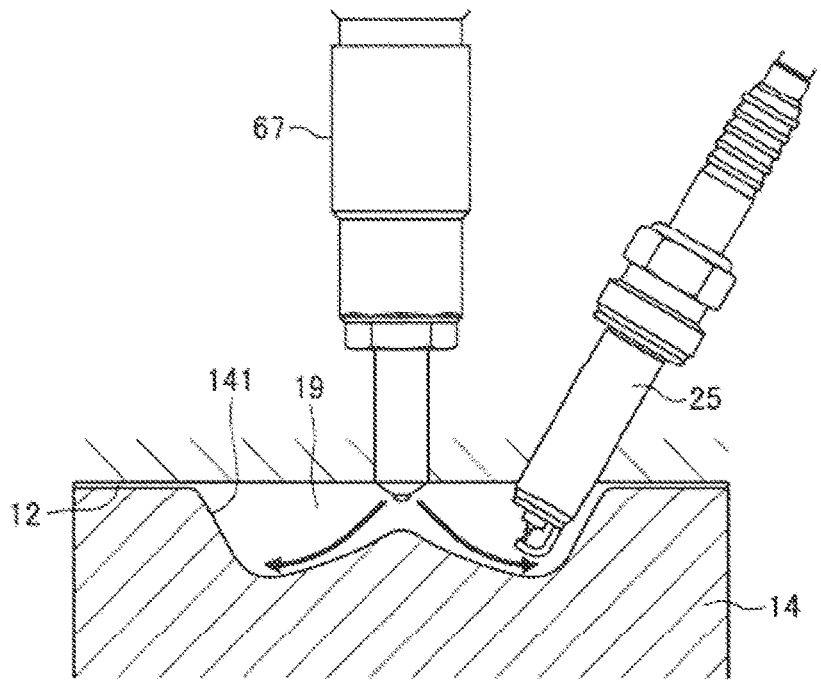
FIG. 3 is an enlarged cross-sectional view showing a combustion chamber.

Hereinafter, a spark-ignition direct injection engine according to embodiments of the present invention is described in detail with reference to the appended drawings. The following description of the preferred embodiments is an illustration. FIGS. 1 and 2 show a schematic configuration of an engine 1 (engine body) of this embodiment. The engine 1 is a spark-ignition gasoline engine that is equipped in a vehicle and supplied with fuel containing at least gasoline. The engine 1 includes a cylinder block 11 provided with a plurality of cylinders 18 (note that, although only one cylinder is illustrated in FIG. 1, here, four cylinders are linearly provided, for example), a cylinder head 12 arranged on the cylinder block 11, and an oil pan 13 arranged below the cylinder block 11 and where a lubricant is stored. Inside the cylinders 18, reciprocating pistons 14 coupled to a crankshaft 15 via connecting rods 142, respectively, are fitted. As shown in FIG. 3 in an enlarged manner, a cavity 141 having a reentrant shape such as the one used in a diesel engine, is formed on a top face of each piston 14. When the piston 14 is at a position near a compression top dead center (CTDC), the cavity 141 faces toward an injector 67 described later. The cylinder head 12, the cylinders 18, and the pistons 14 each formed with the cavity 141 partition combustion chambers 19. Note that, the shape of the combustion chamber 19 is not limited to the shape in the illustration. For example, the shape of the cavity 141, the shape of the top face of the piston 14, and the shape of a ceiling part of the combustion chamber 19 may suitably be changed.

A geometric compression ratio of the engine 1 is set comparatively high to be 15:1 or above so as to improve a theoretical thermal efficiency and stabilize compression-ignition combustion (described later). Note that, the geometric compression ratio may suitably be set within a range of 15:1 to about 20:1.

In the cylinder head 12, an intake port 16 and an exhaust port 17 are formed, and an intake valve 21 for opening and closing the opening of the intake port 16 on the combustion chamber 19 side and an exhaust valve 22 for opening and closing the opening of the exhaust port 17 on the combustion chamber 19 side are arranged for each of the cylinders 18.

In a valve train system of the engine 1 for operating the intake and exhaust valves 21 and 22, a mechanism such as a hydraulically-actuated variable valve mechanism 71 (see FIG. 2, hereinafter, may be referred to as the VVL (Variable Valve Lift)) for switching an operation mode of the exhaust valve 22 between a normal mode and a special mode is provided on an exhaust side. The VVL 71 (the detailed configuration is not illustrated) is configured to include two kinds of cams with different cam profiles from each other in which a first cam has one cam nose and a second cam has two cam noses; and a lost motion mechanism for selectively transmitting an operation state of either one of the first and second cams to the exhaust valve. When the lost motion mechanism transmits the operation state of the first cam to the exhaust valve 22, the exhaust valve 22 operates in the normal mode where it opens only once during the exhaust stroke. On the other hand, when the lost motion mechanism transmits the operation state of the second cam to the exhaust valve 22, the exhaust valve 22 operates in the special mode where it opens once during the exhaust stroke and once more during the intake stroke, which is a so called an exhaust open-twice control. The normal and special modes of the VVL 71 are switched therebetween according to an operating state of the engine. Specifically, the special mode is utilized for a control related to an internal EGR. Hereinafter, the process of operating the VVL 71 in the normal mode so as not to perform the exhaust open-twice control may be referred to as "turning the VVL 71 off," and the process of operating the VVL 71 in the special mode so as to perform the exhaust open-twice control may be referred to as "turning the VVL 71 on." Note that, an electromagnetically-operated valve system for operating the exhaust valve 22 by using an electromagnetic actuator may be adopted for switching between the normal and special modes. Further, the execution of the internal EGR is not limited to the exhaust open-twice control, and it may be achieved through, for example, an internal EGR control by an intake open-twice control or through an internal EGR control where burned gas is left in the cylinder 18 by setting a negative overlap period where both of the intake and exhaust valves 21 and 22 are closed during the exhaust stroke or the intake stroke.

While the valve train system on the exhaust side is provided with the VVL 71, as shown in FIG. 2, a phase variable mechanism 72 (hereinafter, may be referred as the VVT (Variable Valve Timing)) for changing a rotational phase of an intake camshaft with respect to the crankshaft 15 and a lift variable mechanism 73 (hereinafter, may be referred as the CVVL (Continuously Variable Valve Lift) for continuously changing a lift of the intake valve 21 are provided on an intake side of the valve train system. A well-known hydraulic, electromagnetic or mechanical structure may suitably be adopted for the VVT 72 (a detailed structure is not illustrated). Further, various kinds of well-known structure may suitably be adopted for the CVVL 73 (a detailed structure is not illustrated). Open and close timings and the lift of the intake valve 21 can be changed by the VVT 72 and the CVVL 73, respectively.

For each cylinder 18, the injector 67 for directly injecting the fuel into the cylinder 18 is attached to the cylinder head 12. As shown in an enlarged manner in FIG. 3, a nozzle hole of the injector 67 is arranged in a center part of the ceiling face of the combustion chamber 19 to be oriented toward the inside of the combustion chamber 19. The injector 67 directly injects the fuel into the combustion chamber 19 by an amount according to the operating state of the engine 1 at an injection timing set according to the operating state of the engine 1. In this embodiment, the injector 67 (a detailed configuration is not illustrated) is a multi hole injector formed with a plurality of nozzle holes. Thus, the injector 67 injects the fuel so that the fuel spray spreads radially from the central position of the combustion chamber 19. As indicated by the arrows in FIG. 3, at a timing corresponding to the piston 14 reaching the position near the CTDC, the fuel spray injected to spread radially from the center part of the combustion chamber 19 flows along a wall surface of the cavity 141 formed on the piston top face. Therefore, it may be said that the cavity 141 is formed to contain therewithin the fuel spray injected at the timing corresponding to the piston 14 reaching the position near the CTDC. The combination of the multi hole injector 67 and the cavity 141 is advantageous in, after the fuel is injected, shortening a mixture gas forming period and the combustion period. Note that, the injector 67 is not limited to the multi hole injector, and may be an outward opening valve type injector.

A fuel supply path couples between a fuel tank (not illustrated) and the injectors 67. A fuel supply system 62 having a fuel pump 63 and a common rail 64 and for supplying the fuel to each of the injectors 67 at a comparatively high fuel pressure is provided within the fuel supply path. The fuel pump 63 pumps the fuel from the fuel tank to the common rail 64, and the common rail 64 can accumulate the pumped fuel at a comparatively high fuel pressure. By opening the nozzle holes of the injector 67, the fuel accumulated in the common rail 64 is injected from the nozzle holes of the injector 67. Here, the fuel pump 63 is a plunger type pump (not illustrated) and is operated by the engine 1. The fuel supply system 62 including the engine-operated pump enables the supply of fuel to the injector 67 at a high fuel pressure of 30 MPa or above. The fuel pressure may be set to about 120 MPa at the maximum. As described later, the pressure of the fuel to be supplied to the injector 67 is changed according to the operating state of the engine 1. Note that, the fuel supply system 62 is not limited to the above configuration.

Further, in the cylinder head 12, as shown in FIG. 3, an ignition plug 25 for igniting mixture gas inside the combustion chamber 19 is attached for each cylinder 18. In this embodiment, the ignition plug 25 is arranged penetrating the cylinder head 12 so as to extend obliquely downward from the exhaust side of the engine 1. As shown in FIG. 3, a tip of the ignition plug 25 is oriented toward the inside of the cavity 141 of the piston 14 at the CTDC.

On one side surface of the engine 1, as shown in FIG. 1, an intake passage 30 is connected to communicate with each of the intake ports 16 of the cylinders 18. On the other side of the engine 1, an exhaust passage 40 is connected to lead out the burned gas (exhaust gas) discharged from each of the combustion chambers 19 of the cylinders 18.

An air cleaner 31 for filtrating intake air is arranged in an upstream end part of the intake passage 30. A surge tank 33 is arranged near a downstream end of the intake passage 30. A part of the intake passage 30 downstream of the surge tank 33 is branched to become independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are arranged between the air cleaner 31 and the surge tank 33 in the intake passage 30. Further, an intercooler bypass passage 35 for bypassing the intercooler/warmer 34 is connected within the intake passage 30, and an intercooler bypass valve 351 for adjusting an air flow rate passing through the passage 35 is arranged within the intercooler bypass passage 35. A ratio of a flow rate of the intercooler bypass passage 35 and a flow rate of the intercooler/warmer 34 are adjusted through adjusting an opening of the intercooler bypass valve 351, and thus, a temperature of fresh air to be introduced into the cylinder 18 can be adjusted.

An upstream part of the exhaust passage 40 is constituted with an exhaust manifold having independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylinder case and, for example, a three-way catalyst arranged in a flow passage within the case.

A part of the intake passage 30 between the surge tank 33 and the throttle valve 36 is connected with a part of the exhaust passage 40 on the upstream side of the direct catalyst 41 via an EGR passage 50 for recirculating a part of the exhaust gas to the intake passage 30. The EGR passage 50 includes a main passage 51 arranged with an EGR cooler 52 for cooling the exhaust gas by an engine coolant, and an EGR cooler bypass passage 53 for bypassing the EGR cooler 52. An EGR valve 511 for adjusting a recirculation amount of the exhaust gas to the intake passage 30 is arranged within the main passage 51. An EGR cooler bypass valve 531 for adjusting a flow rate of the exhaust gas flowing through the EGR cooler bypass passage 53 is arranged within the EGR cooler bypass passage 53.

The diesel engine 1 with the configuration as described above is controlled by a powertrain control module 10 (hereinafter, may be referred to as the PCM). The PCM 10 is configured with a CPU, a memory, a counter timer group, an interface, and a microprocessor with paths for connecting these units. The PCM 10 configures the controller.

As shown in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air, which are arranged on the downstream side of the air cleaner 31; a second intake air temperature sensor SW3 arranged on the downstream side of the intercooler/warmer 34 and for detecting the temperature of the fresh air after passing through the intercooler/warmer 34; an EGR gas temperature sensor SW4 arranged near a connecting part of the EGR passage 50 with the intake passage 30 and for detecting the temperature of external EGR gas; an intake port temperature sensor SW5 attached to the intake port 16 and for detecting the temperature of the intake air immediately before flowing into the cylinder 18; an in-cylinder pressure sensor SW6 attached to the cylinder head 12 and for detecting the pressure inside the cylinder 18; an exhaust gas temperature sensor SW7 and an exhaust gas pressure sensor SW8 arranged near a connecting part of the exhaust passage 40 with the EGR passage 50 and for detecting the exhaust gas temperature and pressure, respectively; a linear $O_2$ sensor SW9 arranged on the upstream side of the direct catalyst 41 and for detecting an oxygen concentration within the exhaust gas; a lambda $O_2$ sensor SW10 arranged between the direct catalyst 41 and the underfoot catalyst 42 and for detecting an oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW15; and a fuel pressure sensor SW16 attached to the common rail 64 of the fuel supply system 62 and for detecting the fuel pressure to be supplied to the injector 67.

By performing various kinds of operations based on these detection signals, the PCM 10 determines the state of the engine 1, and further the state of the vehicle, and outputs control signals to the injectors 67, the ignition plugs 25, the VVT 72 and CVVL 73 on the intake valve side, the VVL 71 on the exhaust valve side, the fuel supply system 62, and the actuators of the various kinds of valves (throttle valve 36, intercooler/warmer bypass valve 351, the EGR valve 511, and the EGR cooler bypass valve 531) according to the determined state. In this manner, the PCM 10 operates the engine 1.

Figure 4:
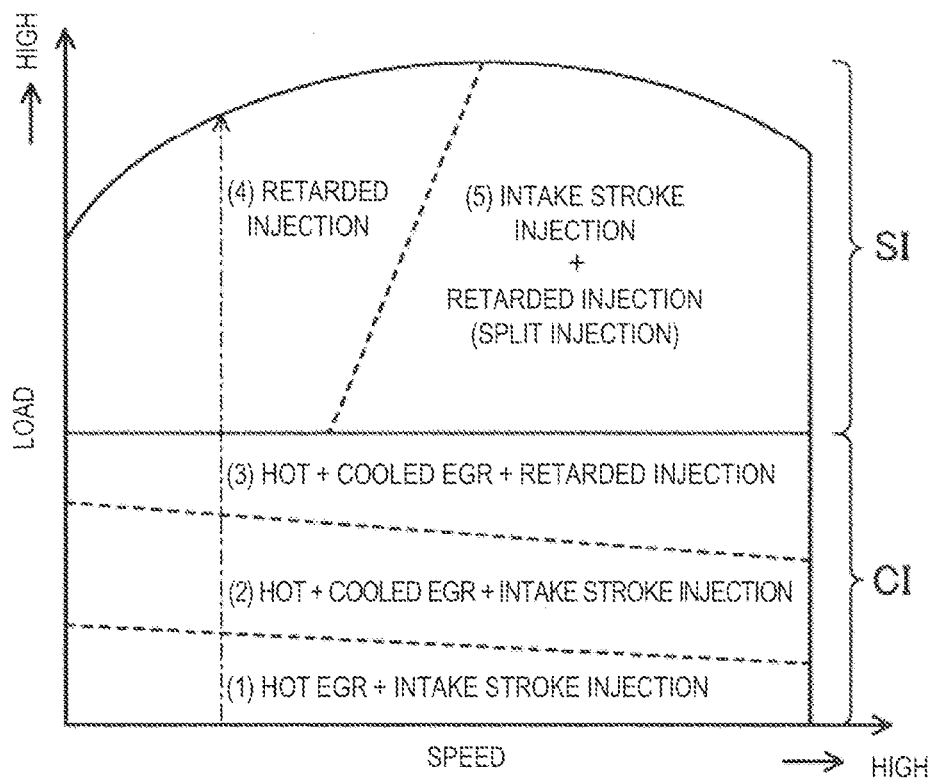
FIG. 4 is a chart exemplifying an operating range of the engine.

FIG. 4 shows one example of an operating range of the engine 1. Within a low engine load range where an engine load is relatively low, the engine 1 does not perform an ignition by the ignition plug 25 and performs compression-ignition combustion in which a combustion is generated by a compression self-ignition, so as to improve fuel consumption and exhaust emission performance. However, with the compression-ignition combustion, the speed of the combustion becomes excessively rapid as the engine load increases, and thus, causes a problem of combustion noises, etc. Therefore, with the engine 1, within a high engine load range where the engine load is relatively high, the compression-ignition combustion is suspended and is switched to a spark-ignition combustion using the ignition plug 25. As described above, the engine 1 is configured to switch a combustion mode according to the operating state of the engine 1, particularly the load of the engine 1, between a CI (Compression-Ignition) mode where the compression-ignition combustion is performed and an SI (Spark-Ignition) mode where the spark-ignition combustion is performed. Note that, the boundary line of switching the mode is not limited to the example in the illustration.

Figure 5A:
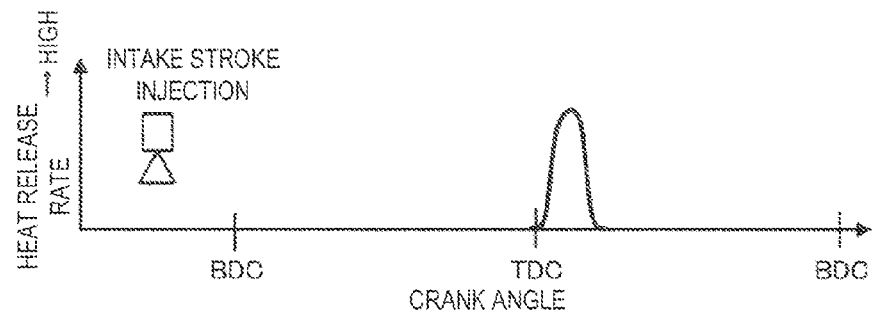
FIG. 5A shows one example of a fuel injection timing in a case where an intake stroke injection is performed in a CI mode, and a heat release rate of a CI combustion caused thereby.

The CI mode is divided into three ranges according to the levels of the engine load. Specifically, within a range (1) with the lowest engine load in the CI mode, hot EGR gas is introduced into the cylinder 18 to improve the ignitability and stability of the compression-ignition combustion. This is achieved by turning the VVL 71 on and performing the exhaust open-twice control of opening the exhaust valve 22 during the intake stroke (described later in detail). The introduction of the hot EGR gas increases the temperature at the end of compression stroke, and is advantageous in improving the ignitability and stability of the compression-ignition combustion within the range (1) with low engine load. Moreover, within the range (1), as shown in FIG. 5A, the injector 67 injects the fuel into the cylinder 18 at least in a period between the intake stroke and the middle stage of the compression stroke, and thus homogeneous lean mixture gas is formed. An air excess ratio $\lambda$ of the mixture gas may be set to, for example, 2.4:1 or higher to enable the suppression of the generation of RawNOx and improve the exhaust emission performance. Thus, as shown in FIG. 5A, the lean mixture gas is compressed to self-ignite near the CTDC.

Although it will be described later in detail, in a part of the range (1) with higher engine load than other parts, specifically, the part including the boundary between the range (1) and a range (2), even though the fuel is injected into the cylinder 18 at least in the period between the intake stroke and the middle stage of the compression stroke, the air-fuel ratio of the mixture gas is set to a theoretical air-fuel ratio ($\lambda \approx 1$). The setting to the theoretical air-fuel ratio enables use of a three-way catalyst, the control when switching between the SI and CI modes is simplified (described later), and, further, contributes in expanding the CI mode applicable range to the high load range side.

In the CI mode, within the range (2) with higher engine load than the range (1), similar to the higher engine load part of the range (1), the fuel is injected into the cylinder 18 at least in the period between the intake stroke and the middle stage of the compression stroke (see FIG. 5A), and the homogeneous mixture gas at the theoretical air-fuel ratio ($\lambda \approx 1$) is formed.

Moreover, within the range (2), since the temperature inside the cylinder 18 naturally increases according to the increase of the engine load, the hot EGR gas amount is reduced to avoid pre-ignition. This reduction is achieved by, although it will be described later in detail, adjusting the internal EGR gas amount to be introduced into the cylinder 18. Moreover, by adjusting the amount of external EGR gas bypassing the EGR cooler 52, the amount of hot EGR gas may be adjusted.

Furthermore, within the range (2), cooled EGR gas is introduced into the cylinder 18. Thus, by introducing the hot EGR gas at a high temperature and the cooled EGR gas at a low temperature into the cylinder 18 at a suitable ratio, the temperature inside the cylinder 18 at the end of the compression stroke is adjusted appropriately, a rapid combustion is avoided while securing the ignitability of the compression-ignition, and the compression-ignition combustion is stabilized. Note that, an EGR ratio (a ratio of the total EGR gas of the hot EGR gas and the cooled EGR gas introduced into the cylinder 18) is set as high as possible under the condition that the air fuel ratio of the mixture gas is set to achieve $\lambda \approx 1$. Therefore, within the range (2), the fuel injection amount increases as the engine load increases, and thus, the EGR ratio gradually reduces.

Figure 5B:
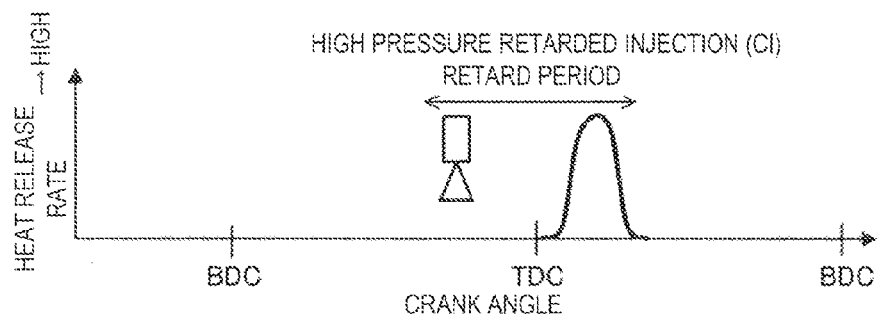
FIG. 5B shows one example of a fuel injection timing in a case where a high pressure retarded injection is performed in the CI mode, and a heat release rate of the CI combustion caused thereby.

Within a range (3) with the highest engine load in the CI mode which includes a switching boundary between the CI mode and the SI mode, if the fuel is injected into the cylinder 18 in the period between the intake stroke and the middle stage of the compression stroke, it causes abnormal combustion such as pre-ignition. On the other hand, if a large amount of cooled EGR gas is introduced to reduce the in-cylinder temperature at the end of the compression stroke, then the ignitability of the compression-ignition will degrade. In other words, since the compression-ignition combustion cannot be performed stably only by controlling the temperature inside the cylinder 18, within the range (3), by devising the fuel injection mode in addition to the temperature control of the cylinder 18, the compression-ignition combustion can be stabilized while avoiding the abnormal combustion, such as pre-ignition. Specifically, in the fuel injection mode, as shown in FIG. 5B, the fuel is injected into the cylinder 18 at least in a period between the late stage of the compression stroke and the early stage of the expansion stroke (hereinafter, the period is referred to as the retard period) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (3). The details of the high pressure retarded injection will be described later.

Within the range (3), the hot EGR gas and the cooled EGR gas are introduced into the cylinder 18 at a suitable ratio similarly to the range (2). Thus, the temperature inside the cylinder 18 at the end of the compression stroke is adjusted appropriately and the compression-ignition combustion is stabilized.

While the CI mode has three divided ranges according to the engine load, the SI mode is divided into two ranges (4) and (5) according to the engine speed. When the operating range of the engine 1 is divided into two higher and lower speed ranges, in FIG. 4, the range (4) corresponds to the lower engine speed range and the range (5) corresponds to the higher engine speed range. Although in the operating ranges shown in FIG. 4, the boundary between the ranges (4) and (5) extending with respect to the engine load is inclined in the engine speed direction, the boundary is not limited to the illustrated example.

In each of the ranges (4) and (5), the mixture gas is set to the theoretical air-fuel ratio ($\lambda \approx 1$) similar to the ranges (2) and (3). Therefore, the air-fuel ratio of the mixture gas is fixed at the theoretical air-fuel ratio ($\lambda \approx 1$) over the boundary between the CI mode and the SI mode, and this enables the use of a three-way catalyst. Moreover, within the ranges (4) and (5), although it is described later in detail, the throttle valve 36 is basically fully opened and the fresh air amount and the external EGR gas amount to be introduced into the cylinder 18 are adjusted by the opening adjustment of the EGR valve 511. Such adjustment of the ratio of gas introduced into the cylinder 18 reduces a pumping loss, and by introducing a large amount of EGR gas into the cylinder 18, the combustion temperature of the spark-ignition combustion is suppressed to be low and reduce a cooling loss. Within the ranges (4) and (5), the external EGR gas cooled mainly by passing through the EGR cooler 52 is introduced into the cylinder 18. Thus, it becomes advantageous to avoid the abnormal combustion as well as to suppress the generation of RawNOx. Note that, within a full engine load range, the EGR valve 511 is fully closed to cancel the external EGR.

The geometric compression ratio of the engine 1 is, as described above, set to 15:1 or above (e.g., 18:1). Since a high compression ratio increases the in-cylinder temperature and the in-cylinder pressure at the end of the compression stroke, it is advantageous in stabilizing the compression-ignition combustion in the CI mode, especially within the low engine load range of the CI mode (e.g., the range (1)). Whereas, in the SI mode that is the high engine load range, this high compression ratio of the engine 1 causes a problem that the abnormal combustion (e.g., pre-ignition and knocking) easily occurs.

Figure 5C:
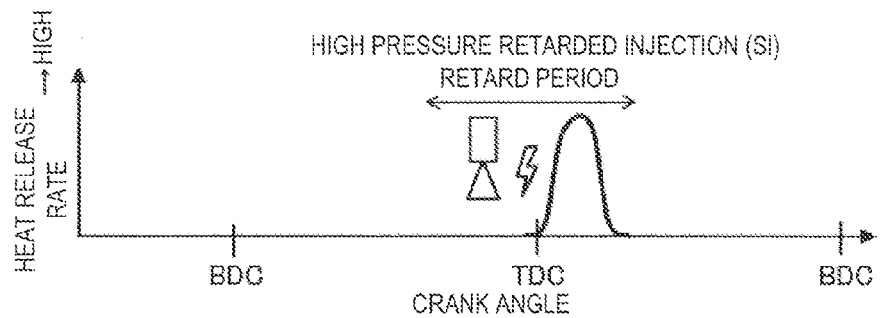
FIG. 5C shows one example of a fuel injection timing and an ignition timing in a case where the high pressure retarded injection is performed in an SI mode, and a heat release rate of the SI combustion caused thereby.
Figure 5D:
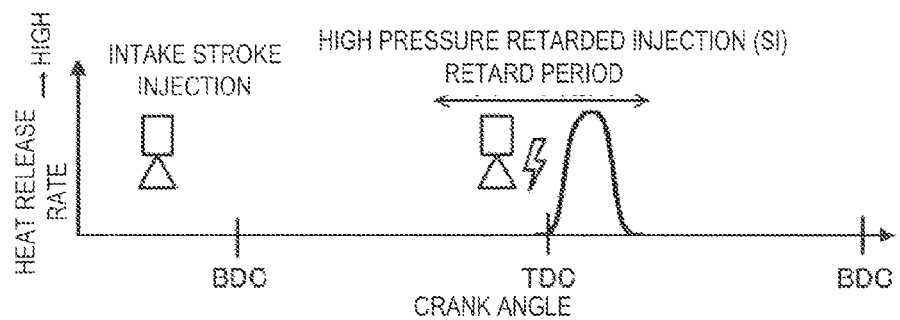
FIG. 5D shows one example of a fuel injection timing and an ignition timing in a case where split injections of the intake stroke injection and the high pressure retarded injection are performed in the SI mode, and a heat release rate of the SI combustion caused thereby.

Thus, with the engine 1, the high pressure retarded injection is performed within the ranges (4) and (5) of the SI mode to avoid the abnormal combustion. Specifically, within the range (4), at a high fuel pressure of 30 MPa or above, as shown in FIG. 5C, only the high pressure retarded injection is performed, in which the fuel is injected into the cylinder 18 in the retard period between the late stage of the compression stroke and the early stage of the expansion stroke. On the other hand, within the range (5), as shown in FIG. 5D, a part of the fuel for injection is injected into the cylinder 18 in an intake stroke period where the intake valve 21 is opened, and the rest of the fuel for the injection is injected into the cylinder 18 within the retard period. In other words, within the range (5), a split injection of fuel is performed. Here, the intake stroke period where the intake valve 21 is opened is a period defined based on open and close timings of the intake valve, and not a period defined based on the piston position. Here, the end of the intake stroke may vary with respect to the timing at which the piston reaches an intake bottom dead center (IBDC) depending on the close timing of the intake valve 21 which is changed by the CVVL 73 and the VVT 72.

Next, the high pressure retarded injection in the SI mode is described with reference to FIG. 6, which shows charts comparing differences in a heat release rate (upper chart) and an extent of reaction of unburned mixture gas (lower chart) between an SI combustion caused by the high pressure retarded injection described above (solid line) and the conventional SI combustion in which the fuel injection is performed during the intake stroke (broken line). The lateral axis in FIG. 6 indicates the crank angle. The comparison is performed under a condition that the operating state of the engine 1 is within the lower engine speed range with high engine load (i.e., the range (4)), and a fuel amount to be injected is the same between the SI combustion caused by the high pressure retarded injection and the conventional SI combustion.

First, for the conventional SI combustion, a predetermined amount of fuel is injected into the cylinder 18 during the intake stroke (broken line in the upper chart). After the fuel is injected, comparatively homogeneous mixture gas is formed inside the cylinder 18 before the piston 14 reaches the CTDC. Further, in this case, the ignition is performed at a predetermined timing indicated by the first white circle after the CTDC, and then the combustion starts. After the combustion starts, as indicated by the broken line in the upper chart of FIG. 6, the combustion ends after progressing through a peak of the heat release rate. A period from the start of the fuel injection until the end of the combustion corresponds to a reactable time length of unburned mixture gas (hereinafter, may simply be referred to as the reactable time length) and, as indicated by the broken line in the lower chart of FIG. 6, the reaction of the unburned mixture gas gradually progresses within the reactable time length. The dotted line in the lower chart indicates an ignition threshold (i.e., a reactivity of the unburned mixture gas being ignited). The conventional SI combustion has, in combination with within the low engine speed range, an extremely long reactable time length, and the reaction of the unburned mixture gas keeps progressing for the reactable time length, and therefore, the reactivity of the unburned mixture gas exceeds the ignition threshold around the ignition timing, causing the abnormal combustion such as pre-ignition and knocking.

On the other hand, the high pressure retarded injection aims to avoid the abnormal combustion by shortening the reactable time length. As shown in FIG. 6, the reactable time length in this case is a total time length of a period where the injector 67 injects the fuel ((1) an injection period), a period from the end of the injection until combustible mixture gas is formed around the ignition plug 25 ((2) a mixture gas forming period), and a period from the start of the combustion started by the ignition until the combustion ends ((3) a combustion period), in other words, (1)+(2)+(3). The high pressure retarded injection shortens each of the injection periods, the mixture gas forming period, and the combustion period, and thereby, shortens the reactable time length. The methods of shortening the periods are explained sequentially.

First, a high fuel pressure relatively increases the fuel injection amount injected from the injector 67 per unit of time. Therefore, in a case where the fuel injection amount is fixed, a relation between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the fuel spray injected into the cylinder 18 and further extends a spreading distance of the fuel spray. Therefore, a relation between the fuel pressure and a fuel vaporization time length substantially becomes as follows: the fuel vaporization time length extends as the fuel pressure decreases, and the fuel vaporization time length contracts as the fuel pressure increases. Further, a relation between the fuel pressure and a time length for the fuel spray to reach around the ignition plug 25 (the fuel spray reaching time length) substantially becomes as follows: the fuel spray reaching time length extends as the fuel pressure decreases, and the fuel spray reaching time length contracts as the fuel pressure increases. The mixture gas forming period corresponds to a total time length of the fuel vaporization time length and the fuel spray reaching time length to around the ignition plug 25; therefore, the mixture gas forming period contracts as the fuel pressure increases. Therefore, the high pressure retarded injection in which the fuel pressure is set significantly higher than the conventional pressure shortens the fuel vaporization time length and the fuel spray reaching time length to around the ignition plug 25 and, as a result, shortens the mixture gas forming period. On the other hand, as indicated by the white circle of the chart in FIG. 6, with the conventional intake stroke injection with the low fuel pressure, the mixture gas forming period is significantly longer. Note that, the combination of the multi hole injector 67 and the cavity 141 shortens the time length from the end of the fuel injection until when the fuel spray reaches around the ignition plug 25 and, as a result, becomes advantageous in shortening the mixture gas forming period.

As described above, shortening the injection period and the mixture gas forming period enables to retard the injection timing of the fuel, more precisely, retard the injection start timing to a comparatively late timing. Therefore, as shown in the upper chart of FIG. 6, with the high pressure retarded injection, the fuel injection is performed within the retard period between the late stage of the compression stroke and the early stage of the expansion stroke. Although, due to injecting the fuel into the cylinder 18 at the high fuel pressure, the turbulence of flow inside the cylinder becomes stronger and a turbulence kinetic energy inside the cylinder 18 increases, the high turbulence kinetic energy is, in combination with retarding the fuel injection timing to the comparatively late timing, advantageous in shortening the combustion period.

In other words, in a case where the fuel injection is performed within the retard period, a relation between the fuel pressure and the turbulence kinetic energy within the combustion period substantially becomes as follows: the turbulence kinetic energy decreases as the fuel pressure decreases, and the turbulence kinetic energy increases as the fuel pressure increases. Here, even if the fuel is injected into the cylinder 18 at the high fuel pressure, in the case where the injection timing is on the intake stroke, due to the time length until the ignition timing being long and inside the cylinder 18 being compressed on the compression stroke after the intake stroke, the turbulence inside the cylinder 18 is subsided. As a result, in the case where the fuel injection is performed during the intake stroke, the turbulence kinetic energy within the combustion period becomes comparatively low regardless of the fuel pressure.

A relation between the turbulence kinetic energy within the combustion period and the combustion period substantially becomes as follows: the combustion period extends as the turbulence kinetic energy decreases and the combustion period contracts as the turbulence kinetic energy increases. Therefore, a relation between the fuel pressure and the combustion period becomes as follows: the combustion period extends as the fuel pressure decreases and the combustion period contracts as the fuel pressure increases. In other words, the high pressure retarded injection shortens the combustion period. On the other hand, with the conventional intake stroke injection with the low fuel pressure, the combustion period extends. Note that, the multi hole injector 67 is advantageous in increasing the turbulence kinetic energy inside the cylinder 18 and shortening the combustion period. Moreover, it is also advantageous in shortening the combustion period to keep the fuel spray contained within the cavity 141 by the combination of the multi hole injector 67 and the cavity 141.

Figure 6:
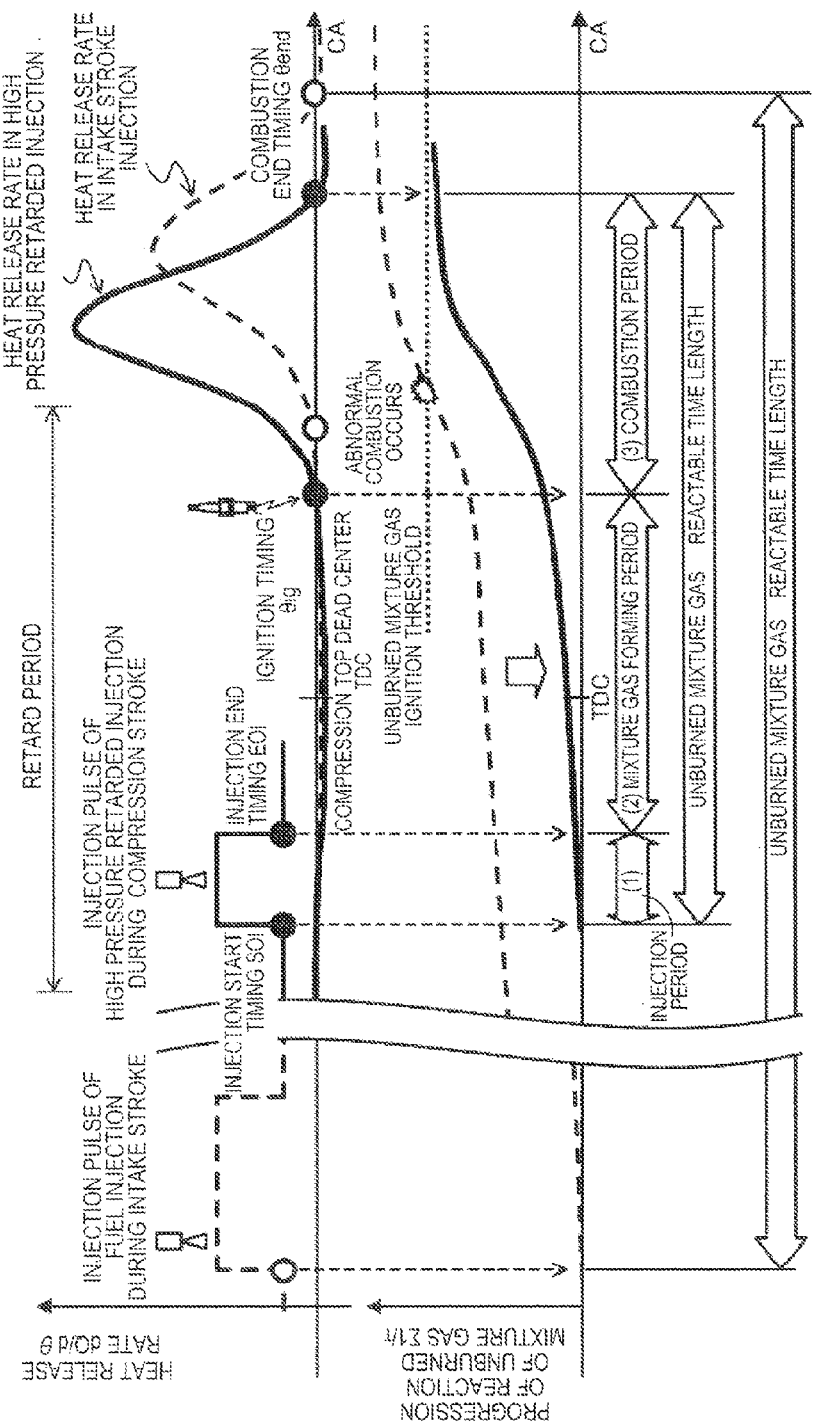
FIG. 6 shows charts comparing the state of an SI combustion caused by the high pressure retarded injection with the state of the conventional SI combustion.

As described above, the high pressure retarded injection shortens each of the injection periods, the mixture gas forming period, and the combustion period, and as a result, as shown in FIG. 6, the high pressure retarded injection can significantly shorten the reactable time length of the unburned mixture gas from a fuel injection start timing SOI to a combustion end timing θ end compared to the conventional case where the fuel injection is performed during the intake stroke. As a result of shortening the reactable time length, as shown in the upper chart of FIG. 6, while the extent of reaction of the unburned mixture gas at the end of the combustion exceeds the ignition threshold and the abnormal combustion occurs with the conventional intake stroke injection with the low fuel pressure as indicated by the white circle, with the high pressure retarded injection, as indicated by the black circle, the progression of the reaction of the unburned mixture gas at the end of the combustion is suppressed and the abnormal combustion can be avoided. Note that, the ignition timings for cases indicated by the white and black circles in the upper chart of FIG. 6 are set to be the same timing.

By setting the fuel pressure to, for example, 30 MPa or above, the combustion period can effectively be shortened.

Moreover, the fuel pressure of 30 MPa or above can also effectively shorten the injection period and the mixture gas forming period. Note that, the fuel pressure may be suitably set according to a type of fuel to be used which at least contains gasoline. The upper limit value of the fuel pressure may be 120 MPa, etc.

The high pressure retarded injection avoids the occurrence of abnormal combustion in the SI mode by devising the mode of the fuel injection into the cylinder 18. Other than such high pressure retarded injection, it has conventionally been known to avoid the abnormal combustion by retarding the ignition timing. The retarded ignition timing suppresses the increases of the temperature and pressure of the unburned mixture gas and, thereby, suppresses the progression of the reaction of the unburned mixture gas. However, while the retarded ignition timing causes degradation of the thermal efficiency and a reduction of the torque, when the high pressure retarded injection is performed, since the abnormal combustion is avoided by devising the mode of the fuel injection, the ignition timing can be advanced, and thus, the thermal efficiency can be improved and the torque can be increased. In other words, the high pressure retarded injection can, not only avoid the abnormal combustion, but also enables the advancement of the ignition timing accordingly, and thereby, is advantageous in improving the fuel consumption.

As described above, the high pressure retarded injection in the SI mode can shorten each of the injection periods, the mixture gas forming period, and the combustion period, while the high pressure retarded injection performed within the range (3) of the CI mode can shorten the injection period and the mixture gas forming period. In other words, by injecting the fuel at the high fuel pressure into the cylinder 18 to increase the turbulence inside the cylinder 18, the atomized fuel is more finely mixed, and even when the fuel is injected at the late timing near the CTDC, the comparatively homogeneous mixture gas can be swiftly formed.

In the high pressure retarded injection in the CI mode, by injecting the fuel at the late timing near the CTDC within the comparatively high engine load range, substantially homogeneous mixture gas is swiftly formed as described above while preventing pre-ignition in, for example, a compression stroke period. Therefore, after the CTDC, the compression ignition can surely be performed. Further, by performing the compression-ignition combustion in an expansion stroke period where the pressure inside the cylinder 18 decreases due to the motoring, the combustion subsides, and excessive increase of the pressure (dP/dt) inside the cylinder 18 due to the compression-ignition combustion can be avoided. Thus, the restriction of NVH is released and, as a result, the range of the CI mode applicable range extends to the high load range side.

Back to the SI mode, as described above, the high pressure retarded injection in the SI mode shortens the reactable time length of the unburned mixture gas by performing the fuel injection in the retard period; however, although the shortening of the reactable time length is advantageous within the low engine speed range where the engine speed is comparatively low because the actual reactable time length against the crank angle change is long, within the high engine speed range where the engine speed is comparatively high, since the actual reactable time length against the crank angle change is short, it is less advantageous. On the other hand, with the retarded injection, since the fuel injection timing is set near the CTDC, on the compression stroke, the in-cylinder gas that does not include the fuel, in other words, air at high specific heat ratio is compressed. As a result, within the high engine speed range, the temperature inside the cylinder 18 at the end of the compression stroke increases, and this increased temperature at the end of the compression stroke causes knocking. Therefore, when only performing the retarded injection within the range (5), there may be a case where it is required to retard the ignition timing to avoid knocking.

Therefore, within the range (5) where the engine speed is relatively high in the SI mode as shown in FIG. 4, a part of the fuel for injection is injected into the cylinder 18 in the intake stroke period, and the rest of the fuel for the injection is injected into the cylinder 18 in the retard period, as shown in FIG. 5D. With the intake stroke injection, the specific heat ratio of the in-cylinder gas on the compression stroke (i.e., the mixture gas including the fuel) may be reduced to suppress the in-cylinder temperature at the end of the compression stroke. By decreasing the in-cylinder temperature at the end of the compression stroke as described above, knocking can be suppressed and, therefore, the ignition timing can be advanced.

Moreover, by performing the high pressure retarded injection, as described above, the turbulence inside the cylinder 18 (in the combustion chamber 19) near the CTDC becomes strong, and the combustion period becomes shorter. This shorter combustion period is also advantageous in suppressing knocking, and the ignition timing can be further advanced. Thus, within the range (5), by performing the split injection including the intake stroke injection and the high pressure retarded injection, the thermal efficiency can be improved while avoiding the abnormal combustion.

Note that, instead of performing the high pressure retarded injection, a multi-point ignition system may be adopted to shorten the combustion period within the range (5). Specifically, a plurality of ignition plugs is arranged to be oriented toward the inside of the combustion chamber 19, and within the range (5), the intake stroke injection is performed as well as each of the plurality of ignition plugs is controlled to perform a multi-point ignition. In this case, since a flame spreads from each of the plurality of fire sources inside the combustion chamber 19, the flame spreads rapidly and the combustion period becomes shorter. As a result, the combustion period is shortened similar to when adopting the high pressure retarded injection, and this shortened combustion period is advantageous in improving the thermal efficiency.

FIGS. 7 to 10 show examples of each parameter of the engine 1 with respect to the level of the engine load within the low engine speed range. The change of the engine load from low to high is illustrated in the operation map of the engine shown in FIG. 4, using the dashed-line arrow.

Figure 7:
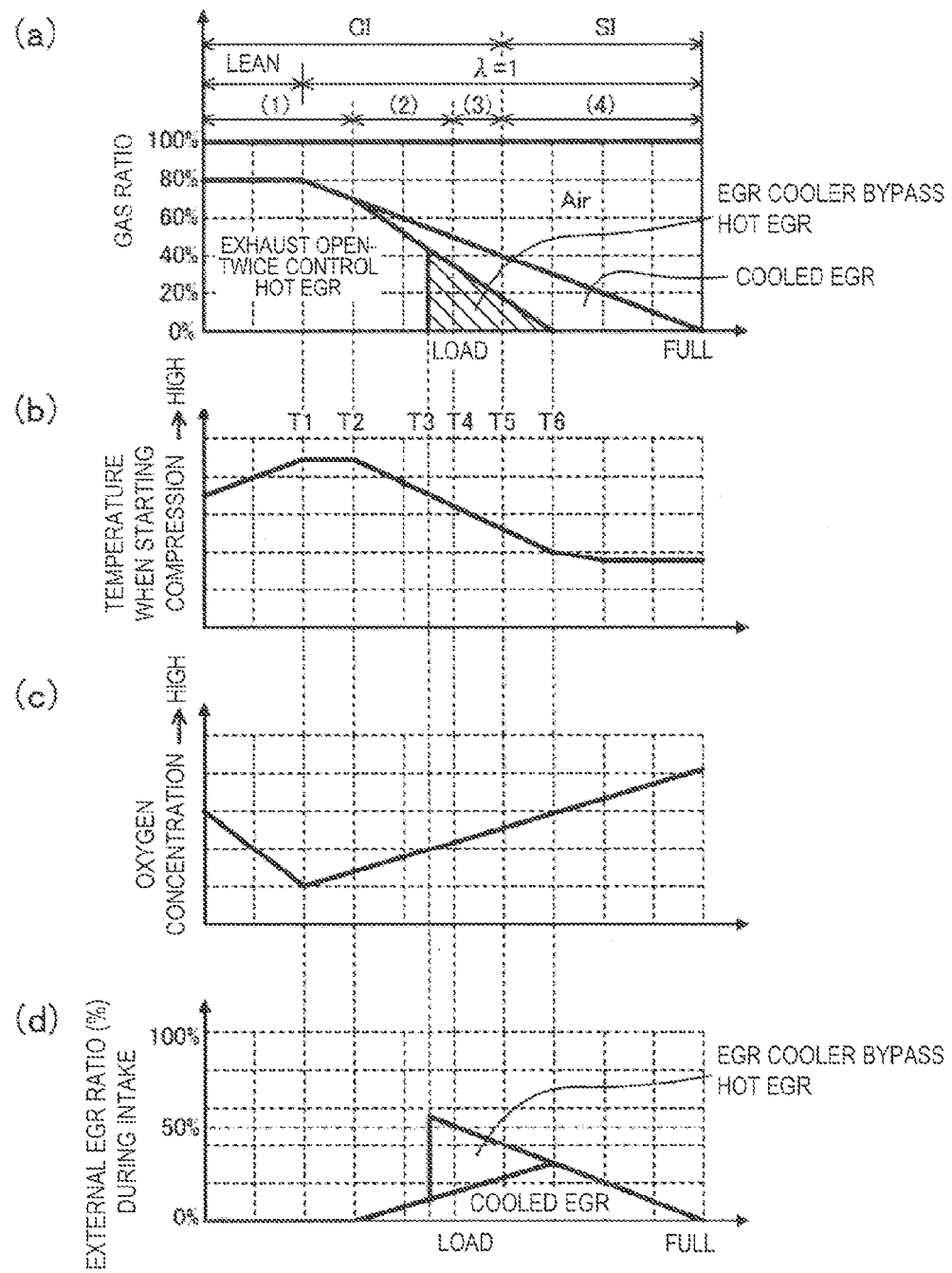
FIG. 7 shows charts illustrating changes of a state inside a cylinder with respect to difference in engine loads, in which the part (a) shows a gas composition inside the cylinder, the part (b) shows a temperature inside the cylinder when starting a compression, the part (c) shows an oxygen concentration, and the part (d) shows an external EGR ratio during the intake.

The parts (a) to (d) of FIG. 7 illustrates the state inside the cylinder 18, in which the part (a) indicates a gas composition (gas ratio) inside the cylinder 18, the part (b) indicates the temperature inside the cylinder 18 when starting the compression, and the part (c) indicates an oxygen concentration. Moreover, the part (d) of FIG. 7 indicates the external EGR ratio during the intake. The external EGR gas can be said to correspond to the amount obtained by excluding the internal EGR gas from the EGR gas introduced into the cylinder 18.

Figure 8:
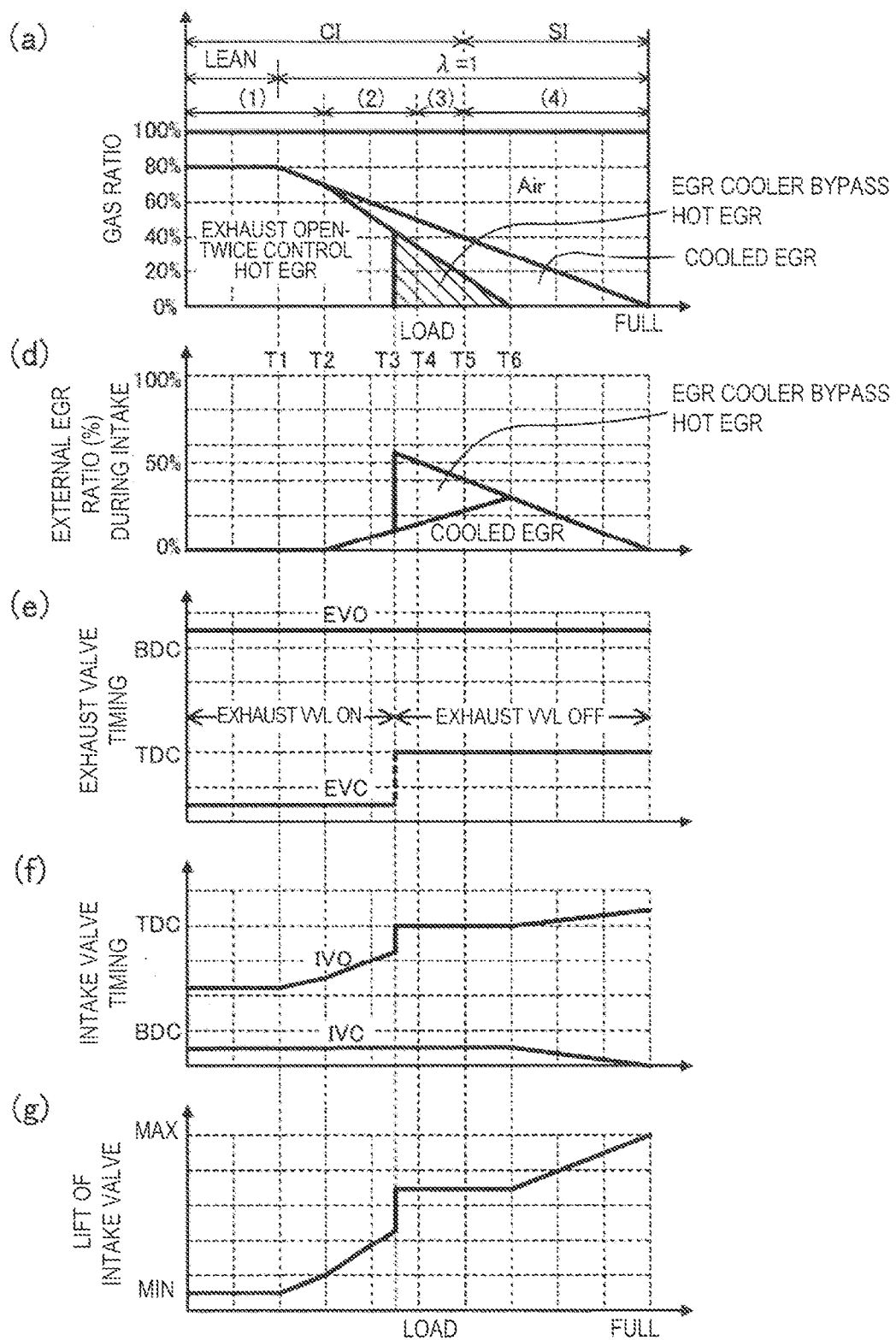
FIG. 8 shows charts illustrating changes of the state inside the cylinder with respect to difference in engine loads, in which the part (a) shows the gas composition inside the cylinder, the part (d) shows an external EGR ratio during the intake, the part (e) shows an exhaust valve timing, the part (f) shows an intake valve timing, and the part (g) shows a lift of an intake valve.

The parts (a) and (d) of FIG. 8 is the same as the parts (a) and (d) of FIG. 7, showing the gas composition inside the cylinder 18 and the external EGR ratio during the intake, respectively. Moreover, the parts (e) to (g) of FIG. 8 illustrate the control of the valve train system, in which the part (e) indicates the open and close timings of the exhaust valve 22, the part (f) indicates the open and close timings of the intake valve 21, and the part (g) indicates the lift of the intake valve.

Figure 9:
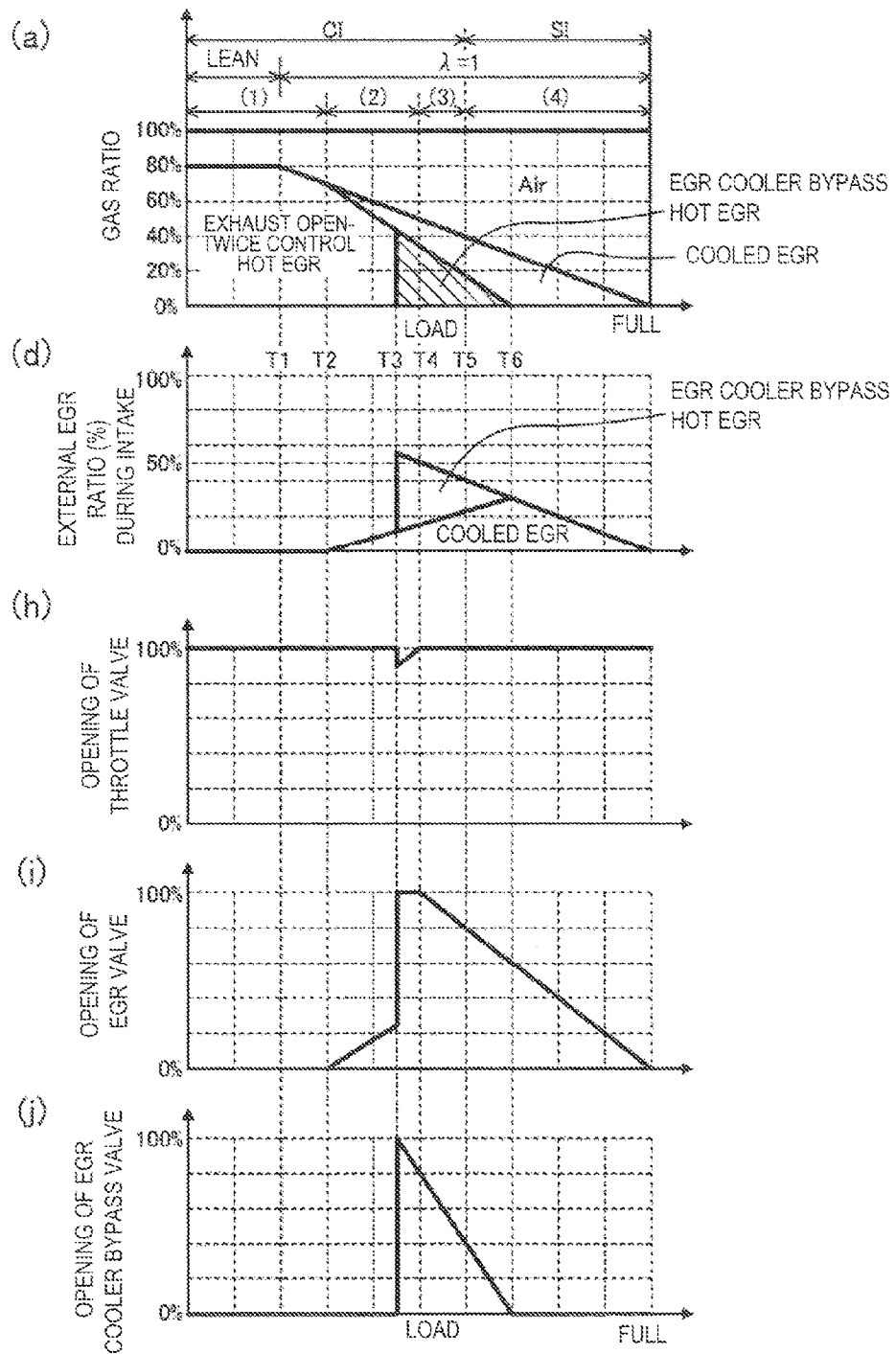
FIG. 9 shows charts illustrating changes of the state inside the cylinder with respect to difference in engine loads, in which the part (a) shows the gas composition inside the cylinder, the part (d) shows the external EGR ratio during the intake, the part (h) shows a throttle opening, the part (i) shows an EGR valve opening, and the part (j) shows an EGR cooler bypass valve opening.

The parts (a) and (d) of FIG. 9 are the same as the parts (a) and (d) of FIG. 7. Moreover, the parts (h) to (j) of FIG. 9 illustrate the control of the intake and exhaust systems, in which the part (h) indicates the opening of the throttle valve 36, the part (i) indicates the opening of the EGR valve 511, and the part (j) indicates the opening of the EGR cooler bypass valve 531.

Figure 10:
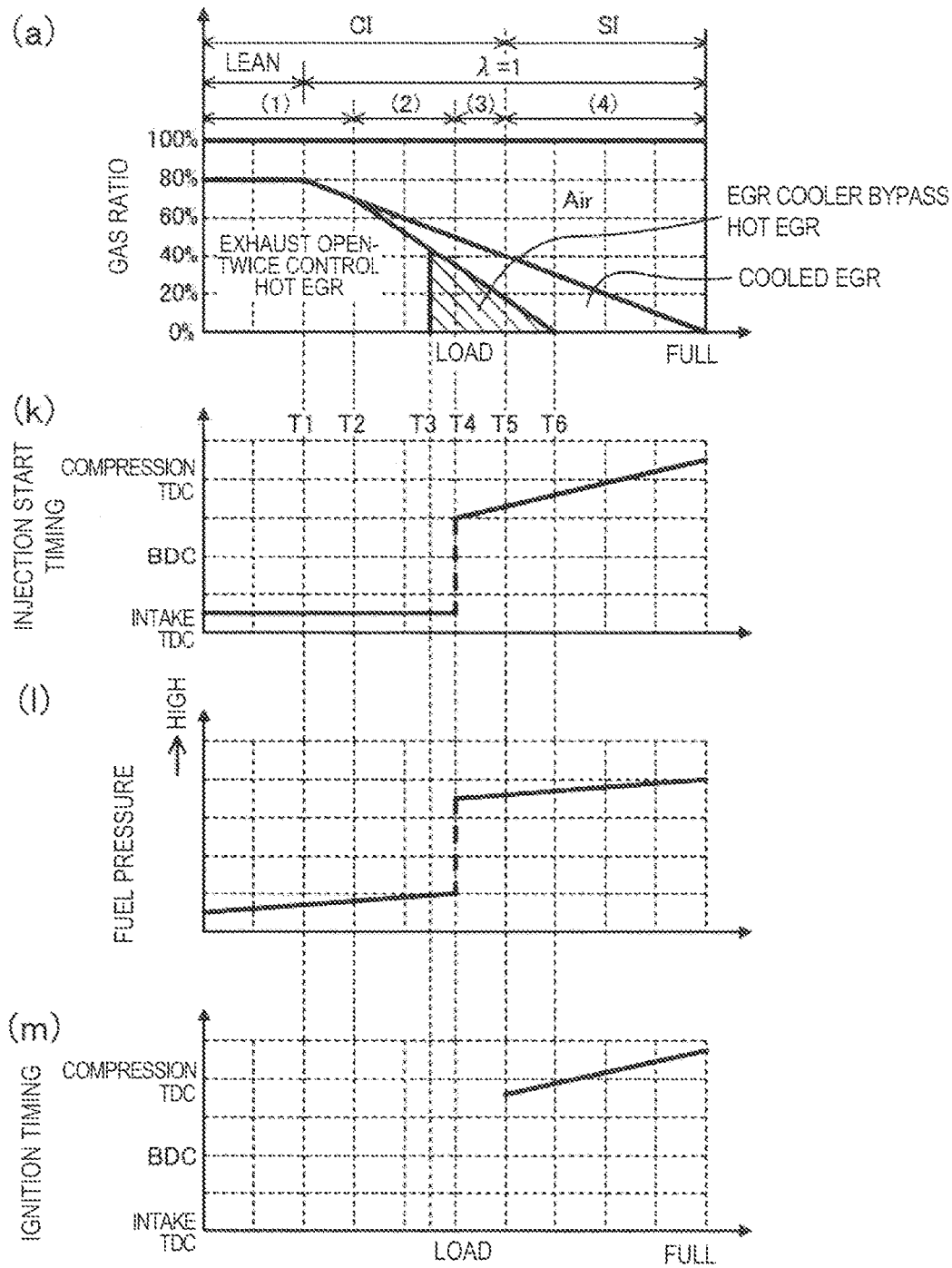
FIG. 10 shows charts illustrating changes of the state inside the cylinder in which the part (a) shows the gas composition inside the cylinder, the part (k) shows an injection start timing of the fuel, the part (l) shows a fuel pressure, and the part (m) shows the ignition timing.

Additionally, the part (a) of FIG. 10 is also the same as the part (a) of FIG. 7, showing the gas composition inside the cylinder 18. Further, the parts (k) to (m) of FIG. 10 illustrate the control of the fuel injection and the ignition system, in which the part (k) indicates the injection start timing, the part (l) indicates the fuel pressure, and the part (m) indicates the ignition timing.

The part (a) of FIG. 7 indicates the state inside the cylinder 18 as described above, in which the operating mode is the CI mode within the range on the left side of the part (a) where the engine load is relatively low, and the operating mode is the SI mode within the range on the right side of the part (a) where the engine load is higher than a predetermined load. The fuel amount (total fuel amount, not illustrated) to be injected into the cylinder 18 is increased as the engine load increases regardless of being in the CI mode or the SI mode.

(Below Predetermined Load T1)

In the CI mode, within the range where the engine load is below the predetermined load T1 (corresponding to the range (1) in the operation map in FIG. 4), fresh air and the internal EGR gas are introduced to create lean mixture gas. Specifically, while the opening of the throttle valve 36 is fully opened as shown in the part (h) of FIG. 9, the exhaust VVL 71 is turned on as shown in the part (e) of FIG. 8 to perform the exhaust open-twice control in which the exhaust valve 22 is opened on the intake stroke. Moreover, as shown in the part (g) of FIG. 8, the lift of the intake valve 21 is set to a minimum, and thus, the internal EGR ratio (the ratio of the internal EGR gas amount introduced into the cylinder 18) increases to a maximum level (also see "S1" in FIG. 11). As described above, within the range (1), for example, mixture gas may be set to be about as lean as the air excess ratio of $\lambda \geq 2.4$. Thus, in combination with the introduction of the large amount of EGR gas into the cylinder 18, the generation of RawNOx is suppressed. The introduction of the large amount of EGR gas into the cylinder 18 is also advantageous in reducing the pumping loss. Note that, as shown in the parts (k) and (l) of FIG. 10, within the range (1), the fuel injection is performed at the relatively low fuel pressure in the intake stroke period, and the fuel pressure gradually increases as the engine load increases.

Below the predetermined load T1 (more specifically, below a predetermined load T2), as shown in the part (b) of FIG. 7, the introduction of the large amount of internal EGR gas into the cylinder 18 leads to increasing the temperature inside the cylinder 18, particularly the temperature at the end of the compression stroke increases, and becomes advantageous in improving the ignitability of the compression ignition and the stability of the compression-ignition combustion. As shown in the part (c) of FIG. 7, the oxygen concentration gradually reduces as the engine load increases. Note that, although it is not illustrated, within the low engine load range or a middle engine load range below a predetermined load T6 where the hot EGR gas is introduced into the cylinder 18, by closing the intercooler bypass valve 351, fresh air after being warmed up by the intercooler/warmer 34 may be introduced into the cylinder 18.

(Between Predetermined Loads T1 and T2)

At engine loads above the predetermined load T1, the air fuel ratio of the mixture gas is set to the theoretical air fuel ratio ($\lambda \approx 1$). Therefore, the fresh air amount introduced into the cylinder 18 increases as the injected fuel amount increases, and accordingly, the EGR ratio reduces (see the part (a) of FIG. 7). Also in between the predetermined load T1 and the predetermined load T2, the fuel injection is performed in the intake stroke period at a relatively low fuel pressure (see the parts (k) and (l) of FIG. 10).

Moreover, between the predetermined load T1 and the predetermined load T2, while the throttle valve is basically fully opened as shown in the part (h) of FIG. 9, the exhaust VVL 71 is turned on as shown in the part (e) of FIG. 8, and the lift of the intake valve 21 is adjusted as shown in the part (g) of FIG. 8, so as to adjust the fresh air amount and the internal EGR gas amount introduced into the cylinder 18.

Figure 11:
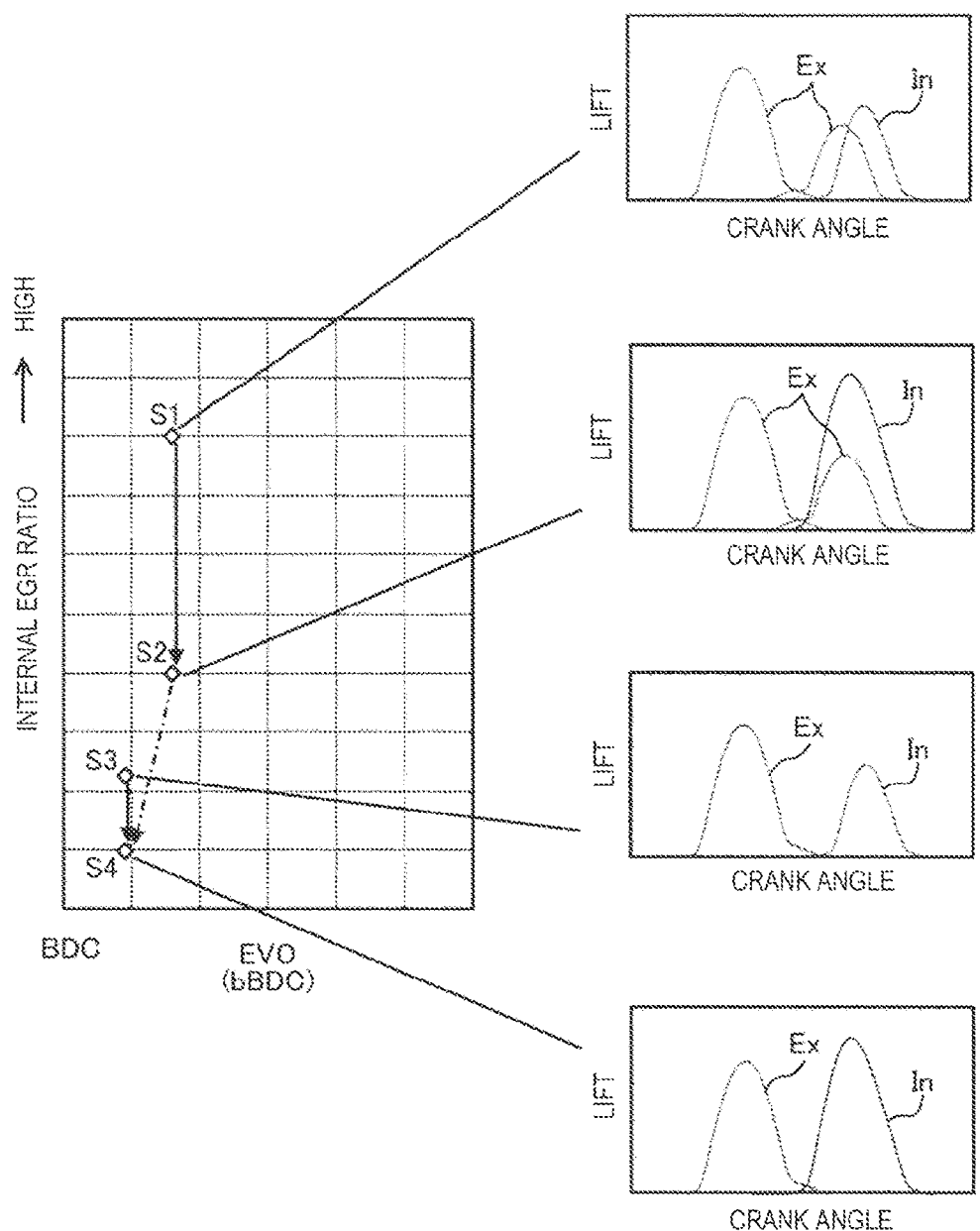
FIG. 11 is a chart showing a relation of open and close timings of the intake and exhaust valves with the internal EGR ratio.

Specifically, as shown in FIG. 11, when the lift of the intake valve 21 is minimized (see S1 in FIG. 11) in the state where the exhaust VVL 71 is turned on to perform the exhaust open-twice control, the internal EGR ratio reaches the maximum level and the fresh air amount introduced into the cylinder 18 reaches a minimum level. This corresponds to the control of the intake and exhaust valves 21 and 22 below the predetermined load T1, as shown in the parts (e), (f), and (g) of FIG. 8.

When the lift of the intake valve 21 is increased in the state where the exhaust open-twice control is performed as indicated by S2 in FIG. 11, the open period of the intake valve 21 overlaps with the open period of the exhaust valve 22 when it is opened the second time, and therefore, the internal EGR ratio decreases. Note that, the close timing of the intake valve 21 is substantially fixed even when the lift of the intake valve 21 is changed. When the lift of the intake valve 21 is changed continuously by the control of the CVVL 73 and the VVT 72, the internal EGR ratio can be reduced continuously. Between the predetermined load T1 and the predetermined load T2, the lift of the intake valve 21 is controlled so that the EGR ratio reaches the maximum level, in other words, the internal EGR gas is introduced into the cylinder 18, while keeping the theoretical air fuel ratio ($\lambda \approx 1$). Specifically, as shown the parts (e), (f) and (g) of FIG. 8, the lift of the intake valve 21 is gradually increased, and the open timing of the intake valve 21 (IVO) is gradually advanced accordingly.

(Between Predetermined Loads T2 and T3)

The range where the engine load is above the predetermined load T2 corresponds to the range (2) in the operation map in FIG. 4, and within this range, there is a possibility that the temperature inside the cylinder 18 increases to cause pre-ignition. Therefore, at engine loads above the predetermined load T2, the internal EGR gas amount is reduced, and the cooled external EGR gas is introduced into the cylinder 18 instead. Specifically, as shown in the part (i) of FIG. 9, the opening of the EGR valve 511 is gradually increased from the closed state, and thus, the amount of the external EGR gas cooled by passing the EGR cooler 52 is gradually increased due to the increase of the load on the engine 1. Note that, as shown in the part (j) of FIG. 9, the EGR cooler bypass valve 531 remains closed. Thus, the cooled external EGR gas (i.e., cooled EGR gas) is gradually increased as the engine load increases (also see the part (d) of FIG. 7).

On the other hand, as shown in the part (a) of FIG. 7, the EGR ratio including the internal EGR gas and the external EGR gas is reduced at a predetermined ratio with respect to the increase of the engine load so as to set the air fuel ratio of the mixture gas to a theoretical air-fuel ratio ($\lambda \approx 1$) also on the higher engine load side than the predetermined load T2. Therefore, on the high engine load above the predetermined load T2, the internal EGR gas amount is reduced according to the increase of the engine load at a higher decreasing rate than on the lower engine load side than the predetermined load T2 (i.e., the inclination in the part (a) in FIG. 7 increases). Specifically, as shown in the parts (e), (f) and (g) of FIG. 8, the lift of the intake valve 21 is gradually increased according to the increase of the engine load at a higher increasing rate than on the lower engine load side than the predetermined load T2, and accordingly, the open timing of the intake valve 21 (IVO) is gradually advanced.

Thus, as shown in the part (b) of FIG. 7, the temperature inside the cylinder 18 gradually decreases according to the increase of the engine load on the higher engine load side than the predetermined load T2.

(Between Predetermined Loads T3 and T4)

The adjustment of the introduction amount of the internal EGR gas is, as described above, performed by adjusting the overlapping length of the open period of the intake valve 21 with the open period of the exhaust valve 22 opened in the intake stroke period, which is basically performed by the control of the intake CVVL 73. As indicated by the solid arrow in FIG. 11, although the introduction amount of the internal EGR gas can be reduced continuously to a predetermined amount (see S1 and S2 in FIG. 11), the open period of the exhaust valve 22 cannot be adjusted, and therefore, in order to reduce the introduction amount below the predetermined amount, the exhaust VVL 71 needs to be turned off to suspend the exhaust open-twice control. Therefore, as indicated by S3 and S4 in FIG. 11, due to switching the exhaust VVL 71 between on and off, the introduction amount of the internal EGR gas is reduced intermittently as a result (see the dashed-line arrow in FIG. 11).

Since the internal EGR gas introduced into the cylinder 18 cannot be reduced continuously as described above, at a predetermined load T3 within the range (2), the introduction of the internal EGR gas into the cylinder 18 is suspended, and as a substitute hot EGR gas, the external EGR gas after bypassing the EGR cooler 52 and not cooled is introduced into the cylinder 18.

Specifically, as shown in the part (e) of FIG. 8, while the exhaust VVL 71 is turned off to suspend the exhaust open-twice-control, the lift of the intake valve 21 is intermittently and greatly changed, and the open timing of the intake valve 21 is accordingly advanced greatly to near an intake top dead center (ITDC). Note that, at least on the higher engine load side than the predetermined load T3 in the CI mode, the open and close timings of the intake valve 21 and the exhaust valve 22 are respectively kept fixed regardless of the engine load.

Moreover, as shown in the part (i) of FIG. 9, the opening of the EGR valve 511 is changed to be fully opened, as well as the opening of the EGR cooler bypass valve 531 is also changed to be fully opened as shown in the part (j) of FIG. 9. Furthermore, as shown in the part (h) of FIG. 9, the opening of the throttle valve 36 is temporarily throttled so as to increase the EGR ratio to 50% or higher. Thus, as shown in the part (d) of FIG. 9, a required amount of hot EGR gas (i.e., the non-cooled external EGR gas) is introduced into the cylinder 18 at the predetermined load T3. In order to reduce the hot EGR gas amount corresponding to the increase of the engine load, on the higher engine load side than the predetermined load T3, while the opening of the EGR cooler bypass valve 531 is gradually reduced from the fully-opened state as shown in the part (j) of FIG. 9, the opening of the throttle valve 36 is gradually opened more to be fully opened while keeping the EGR valve 511 fully opened, so as to increase the cooled EGR gas amount corresponding to the increase of the engine load.

(Between Predetermined Loads T4 and T5)

At engine loads above a predetermined load T4 in the CI mode, achieving both securing the ignitability of the compression-ignition and avoiding the abnormal combustion (e.g., pre-ignition) is difficult by only adjusting the introduction ratio between the cooled EGR gas and the hot EGR gas. Therefore, the high pressure retarded injection is performed.

The range where the engine load is above the predetermined load T4 corresponds to the range (3) in the operation map of FIG. 4.

As shown in the part (k) of FIG. 10, the fuel injection start timing is greatly changed from during the intake stroke within the ranges (1) and (2) to near the CTDC. Moreover, as shown in the part (l) of FIG. 10, the fuel pressure is also greatly changed from the low fuel pressure within the ranges (1) and (2) to the high fuel pressure of 30 MPa or above. Although the fuel injection mode is greatly changed between the ranges (2) and (3) as described above, since the gas composition inside the cylinder 18 continuously changes, each of the open and close periods of the intake valve 21 and the exhaust valve 22, the opening of the throttle valve 36, the opening of the EGR valve 511, and the opening of the EGR cooler bypass valve 531 do not change rapidly (see the parts (e), (f) and (g) of FIG. 8, and the parts (h), (i) and (j) of FIG. 9. This is advantageous in suppressing the generation of, for example, torque shock when shifting from within the range (2) to the range (3), and can simplify control.

On the higher engine load side than the predetermined load T4, the start timing of the fuel injection as the high pressure retarded injection is, as shown in the part (k) of FIG. 10, advanced gradually according to the increase of the engine load. Moreover, the fuel pressure is, as shown in the part (l) of FIG. 10, also set high according to the increase of the engine load. Due to the increase of the engine load, pre-ignition may occur more easily, and the pressure increase may be more significant. Therefore, the fuel injection start timing is further retarded and the fuel pressure is set even higher to effectively avoid the above problem.

Moreover, between the predetermined load T4 and a predetermined load T5, while the opening of the throttle vale 36 is fixed to be fully opened (see the part (h) of FIG. 9), each of the opening of the EGR valve 511 and the opening of the EGR cooler bypass valve 531 decreases according to the increase of the engine load (see the parts (i) and (j) of FIG. 9). Note that, when comparing the opening of the EGR valve 511 to the opening of the EGR cooler bypass valve 531, the opening of the EGR cooler bypass valve 531 has a higher decreasing rate therebetween.

(Between Predetermined Loads T5 and T6)

The predetermined load T5 corresponds to the boundary of switching between the CI mode and the SI mode, and the higher engine load side than the predetermined load T5 corresponds to the SI mode. Since the air fuel ratio of the mixture gas is set to the theoretical air fuel ratio ($\lambda \approx 1$) in both the lower and higher engine load sides sandwiching therebetween the boundary of switching between the CI mode and the SI mode, the EGR ratio is set to reduce continuously from the CI mode to the SI mode. In shifting from the CI mode to the SI mode where the combustion mode is switched, the reducing EGR ratio causes no significant change other than starting the spark ignition, smoothens the switch from the CI mode to the SI mode and the other way around as well, and can suppress the generation of torque shock, etc. Since the control responsiveness regarding the recirculation of the exhaust gas through the EGR passage 50 is particularly comparatively low, the control avoiding a rapid change in the EGR ratio is effective in improving the controllability.

Moreover, in the CI mode, due to the EGR ratio being set as high as possible as described above, the EGR ratio becomes high within the low engine load range in the SI mode near the boundary with the CI mode. The high EGR ratio is, although advantageous in reducing the pumping loss, may become disadvantageous regarding the combustion stability in the SI mode.

There, within the low engine load range in the SI mode, specifically, on the lower engine load side than the predetermined load T6, the hot EGR gas is introduced into the cylinder 18. Specifically, the non-cooled external EGR gas after passing through the EGR cooler bypass passage 53 is introduced into the cylinder 18. Thus, as shown in the part (b) of FIG. 7, the temperature inside the cylinder 18 is set relatively high and the time length by which the ignition is retarded is shortened to improve the stability of the spark-ignition combustion under the high EGR ratio environment.

Specifically, as shown in the parts (i) and (j) of FIG. 9, each of the opening of the EGR valve 511 and the opening of the EGR cooler bypass valve 531 is gradually reduced according to the increase of the engine load, continuously from the CI mode. Thus, the cooled EGR gas amount increases and the hot EGR gas amount decreases while the engine load increases, and the EGR ratio including the cooled EGR gas and the hot EGR gas gradually decreases while the engine load increases. Therefore, the fresh air amount increases. Since, at engine loads above the predetermined load T6, the combustion stability improves by the temperature increase inside the cylinder 18, the EGR cooler bypass valve 531 is closed to reduce the hot EGR gas amount to zero. Here, the EGR valve 511 is opened. Moreover, between the predetermined load T5 and the predetermined load T6, the opening of the throttle valve is kept fully opened (see the part (h) of FIG. 9) and the open and close timings of the intake valve 21 and the exhaust valve 22 are fixed (see the parts (e), (f) and (g) of FIG. 8).

On the other hand, the fuel injection start timing is, as shown in the part (k) of FIG. 10, gradually retarded according to the increase of the engine load, and the fuel pressure is, as shown in the part (l) of FIG. 10, gradually increased also according to the increase of the engine load. Further, the ignition timing is, as shown in the part (m) of FIG. 10, gradually retarded according to the increase of the engine load, along with the fuel injection start timing. Note that, within the range on the low engine load side in the SI mode between the predetermined load T5 and the predetermined load T6, although the spark ignition is performed by operating the ignition plug 25, the combustion mode is not limited to the mode where the flame core is produced by the spark ignition and the flame propagates, but it may be a mode where the low-temperature oxidation reaction is stimulated by the spark ignition to self-ignite.

(Above Predetermined Load T6)

In the SI mode, on the higher engine load side than the predetermined load T6, as shown in the parts (a) and (b) of FIG. 7, the hot EGR gas amount becomes zero, and only the cooled EGR gas is introduced into the cylinder 18. Note that, although it is not illustrated, on the higher engine load side than the predetermined load T6, the intercooler bypass valve 351 may be opened (e.g., the opening of the intercooler bypass valve 351 may be gradually increased according to the increase of the engine load) to increase the fresh air amount bypassing the intercooler/warmer 34, and thus, the temperature of fresh air introduced into the cylinder 18 may be lowered. The lowered fresh air temperature leads to lowering the temperature inside the cylinder 18 and is advantageous in avoiding the abnormal combustion (e.g., pre-ignition and knocking) in the higher engine load range.

Moreover, the opening of the throttle valve 36 is kept fully opened as shown in the part (h) of FIG. 9, and the opening of the EGR valve 511 is gradually reduced according to the increase of the engine load to be fully closed at the full load as shown in the part (i) of FIG. 9. Therefore, the EGR ratio is zero at the full load (see the parts (a) and (d) of FIG. 7). On the other hand, the lift of the intake valve 21 is gradually increased according to the increase of the engine load to be a maximum lift at the full load as shown in the parts (f) and (g) of FIG. 8. By increasing the fresh air amount introduced into the cylinder 18 according to the increase of the engine load as described above, the torque on the high engine load part of the operating range of the engine 1 is increased.

Further, as shown in the parts (k), (l) and (m) of FIG. 10, the fuel injection start timing is gradually retarded according to the increase of the engine load, and the fuel pressure is set gradually higher according to the increase of the engine load. The ignition timing is also gradually retarded according to the increase of the engine load. Although the abnormal combustion easily occurs due to the increase of the engine load, by retarding the ignition start timing and increasing the fuel pressure, it can effectively be avoided.

Figure 12:
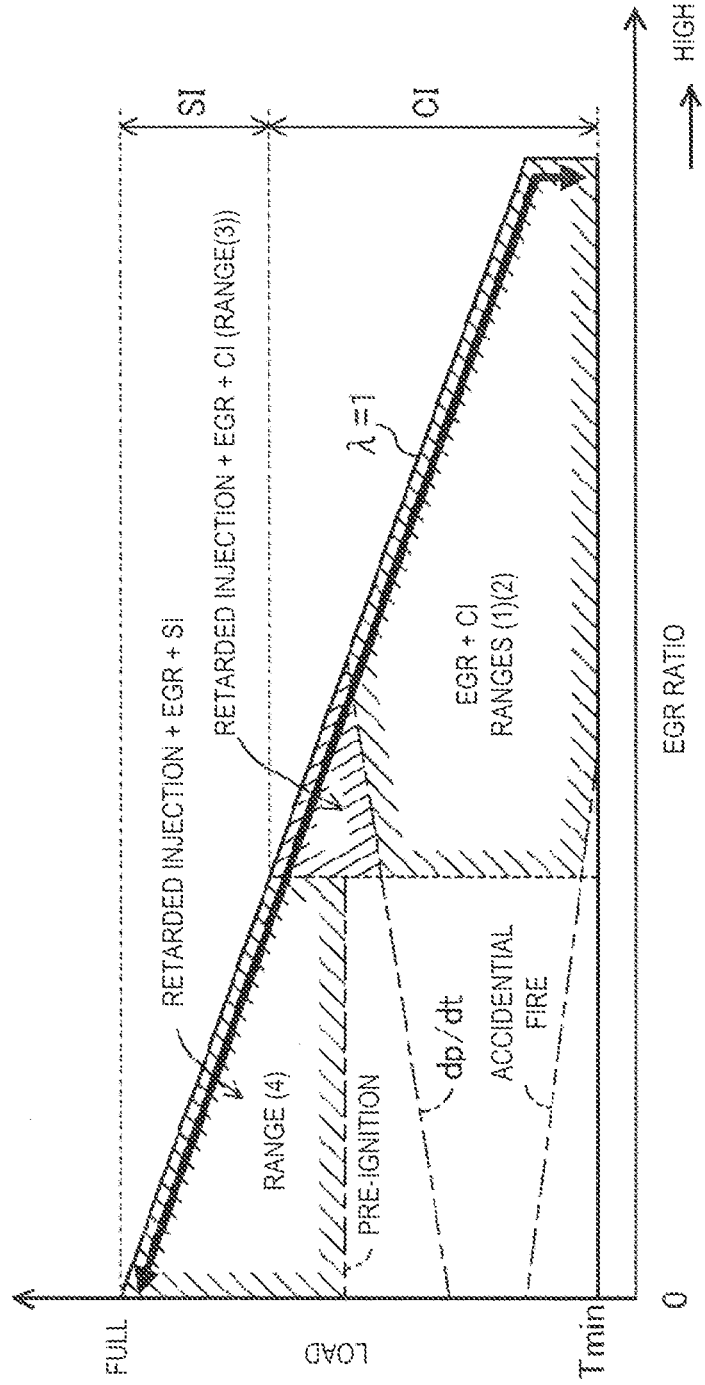
FIG. 12 shows a relation between the EGR ratio and the engine load with respect to a certain engine speed.

As described above, the change of each parameter with respect to the level of the engine load is described with reference to FIGS. 7 to 10. Meanwhile, FIG. 12 shows a relation between the EGR ratio and the engine load. As described above, while the air fuel ratio is set lean within the low engine load range, within the higher engine load range than the low engine load range, the air fuel ratio is fixed at the theoretical air fuel ratio ($\lambda \approx 1$) regardless of the level of the engine load and difference in combustion mode. The engine 1 is controlled along a control line indicated by the thick solid arrow in FIG. 12, and the EGR ratio is set to the maximum level under a condition of setting the air fuel ratio to the theoretical air fuel ratio ($\lambda \approx 1$). Therefore, the EGR ratio continuously changes with respect to the level of the engine load regardless of switching the combustion mode. Since the continuous change of the EGR ratio leads to a continuous change of the gas composition inside the cylinder 18 when the engine load continuously changes, it is advantageous in improving the controllability.

In the combustion mode where the compression-ignition combustion is performed by injecting the fuel during the intake stroke while introducing a large amount of EGR gas into the cylinder 18 (i.e., corresponding to the ranges (1) and (2)), as indicated by the dashed line in FIG. 12, the engine load cannot reach above a predetermined level because of the restriction of dP/dt. However, here, due to performing the high pressure retarded injection in which the fuel is injected at the high fuel pressure of 30 MPa or above near the CTDC, and introducing the comparatively large amount of EGR gas into the cylinder 18, the compression-ignition combustion can be stably performed while subsiding the combustion to eliminate the restriction of dP/dt. This restriction elimination corresponds to the combustion mode within the range (3) in FIG. 4, and the CI mode applicable range can be expanded to the high load range side. It can be said that the continuous change of the EGR ratio according to the level of the engine load can be realized by providing the range (3).

Due to the high geometric compression ratio of the engine 1, within the range of the SI combustion where the abnormal combustion (e.g., pre-ignition) may occur (see the dashed line in FIG. 12), by performing the high pressure retarded injection, such an abnormal combustion can be avoided and a stabilized spark-ignition combustion can be performed. Also since the high pressure retarded injection improves the combustion stability, it is advantageous in securing predetermined combustion stability even while a high EGR ratio is set at the engine load immediately after the CI mode is switched to the SI mode. This is another factor enabling the continuous change of the EGR ratio with respect to the level of the engine load.

Thus, with the engine 1 accompanied by switching between the SI mode and the CI mode, securing the state quantity inside the cylinder 18 with respect to the level of the engine load is advantageous in suppressing torque shock and the like when switching the mode.

Moreover, with the engine 1 where the geometric compression ratio is set high, the volume of the combustion chamber 19 becomes comparatively small at the timing of injecting the fuel in the high pressure retarded injection. Although the high pressure retarded injection may be disadvantageous in view of the air utilization ratio within the combustion chamber 19, since the fuel is injected into the cavity 141 at the high fuel pressure in the high pressure retarded injection, the flow within the cavity 141 is increased, and as a result, the air utilization ratio is increased. Especially since the injector 67 is a multi-hole type injector, it effectively increases the gas turbulence kinetic energy inside the cavity 141 and becomes advantageous in increasing the air utilization ratio.

As a result, within the range (3) in the CI mode, the comparatively lean mixture gas is rapidly formed, and the ignitability and stability of the compression-ignition combustion improve. Similarly, the abnormal combustion is also avoided within the range (4) in the SI mode.

Here, when comparing the high pressure retarded injection in the CI mode with the high pressure retarded injection in the SI mode, as shown in the part (k) of FIG. 10, the fuel injection start timing is set more on the advanced side with the high pressure retarded injection in the CI mode. This is because, within the range (3) where the high pressure retarded injection is performed in the CI mode, a large amount of EGR gas can be introduced into the cylinder due to performing the compression-ignition combustion and the load of the engine 1 being relatively low, and the combustion can be subsided due to the large amount of EGR gas. Thus, by advancing the fuel injection start timing within the limit that the abnormal combustion can be avoided, the timing of the compression ignition is retarded to after the CTDC while securing the forming period of the lean mixture gas to be longer to some extent to improve the ignitability and the combustion stability, and thus, the combustion caused by the large amount of EGR gas can be inhibited, as well as avoiding a rapid pressure increase.

On the other hand, within the range (4) (or (5)) where the high pressure retarded injection in the SI mode is performed, since a large amount of EGR gas cannot be introduced into the cylinder 18 in view of the combustion stability, it is preferable to avoid the abnormal combustion due to the effect of the retarded injection by retarding the fuel injection start timing as much as possible.

(Another Configuration According to Control of Hot EGR Gas)

As described above, by combining the control of the exhaust VVL 71 with the control of the intake CVVL 73, when the internal EGR gas amount is adjusted, the discontinuity of the EGR ratio occurs at a predetermined amount (see FIG. 11). An engine 100 shown in FIGS. 13 to 18 enables continuous change in the internal EGR gas amount from the maximum amount to zero, using a dynamic pressure in the exhaust gas.

Specifically, the engine 100 has a characteristic in its configuration on the exhaust side. FIGS. 14 to 17 are views showing a structure of an exhaust manifold 400 in detail. As shown in FIGS. 14 to 17, the exhaust manifold 400 has three independent exhaust passages 401, 402 and 403 of which upstream end parts are connected to respective exhaust ports 17 of the first to fourth cylinders 18A to 18D (here, two exhaust ports are provided for each cylinder), a manifold section 404 where downstream end parts (end parts on the side far from the engine body 100) of the independent exhaust passages 401, 402 and 403 are bundled to be close to each other while keeping their independence, and a negative pressure generating device 405 provided downstream of the manifold section 404 and formed therein with a common space communicating with all of the independent exhaust passages 401, 402 and 403. In the exhaust manifold 400, a single exhaust pipe 40 is connected downstream of the negative pressure generating device 405. For convenience of illustration, in FIG. 16, the independent exhaust passages 401, 402 and 403 are indicated by virtual lines, and in FIG. 15, bypass passages 411, 412 and 413 and a bypass downstream section 414 are omitted.

As described above, in the engine 100, the three independent exhaust passages 401, 402 and 403 are prepared for the four cylinders 18A to 18D. This is because the independent exhaust passage 402 located closer to the center in the cylinder aligned direction than the other two passages are bifurcated so as to be commonly usable for the second and third cylinders 18B and 18C. Specifically, the independent exhaust passage 402 has two branched passage sections 4021 and 4022 extending from the ports 17 of the second cylinder 18B and the ports 17 of the third cylinder 18C, respectively, to merge with each other on the downstream side thereof, and a single common passage section 4023 extending further downstream from the part where the branched passage sections 4021 and 4022 merge with each other. On the other hand, each of the independent exhaust passages 401 and 403 connected with the exhaust ports 17 of the first and fourth cylinders 18A and 18D is formed to be a single pipe with no branches. Note that, hereinafter, the independent exhaust passages 401 and 403 each formed to be a single pipe may be referred to as "the first independent exhaust passage 401" and "the third independent exhaust passage 403," respectively. Also, the bifurcated independent exhaust passage 402 may be referred to as "the second independent exhaust passage 402."

With the four-cycle four-cylinder engine 100, the ignition is performed in the order of the first cylinder 18A, the third cylinder 18C, the fourth cylinder 18D, and then the second cylinder 18B. Therefore, the second and third cylinders 18B and 18C connected with the upstream end part of the bifurcated second independent exhaust passage 402 are not in a relation where the exhaust order (the order of performing the exhaust stroke) is not continuous therebetween. Therefore, even when the independent exhaust passage 402 is commonly connected with the second and third cylinders 18B and 18C, the exhaust gas from both the cylinders 18B and 18C does not flow into the independent exhaust passage 402 simultaneously.

The first and third independent exhaust passages 401 and 403 formed to be a single pipe extend toward the center in the cylinder aligned direction so that the positions of their downstream end parts match with that of the downstream end part of the second independent exhaust passage 402. Specifically, as particularly shown in FIG. 15, the downstream end parts of the first independent exhaust passage 401, the downstream end part of the common passage section 4023 of the second independent exhaust passage 402, and the downstream end part of the third independent exhaust passage 403 are bundled into one at a position which is separate toward the downstream side from the center position of the wall face of the engine body 1 on the exhaust side (the position corresponding to between the second and third cylinders 18B and 18C in the top view of the engine). The manifold section 404 is formed with the downstream end parts of the three independent exhaust passages 401, 402 and 403 that are bundled, and a holding member holding the downstream end parts in the bundled state, etc.

Figure 17:
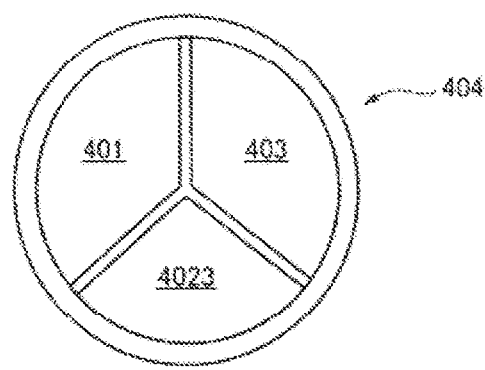
FIG. 17 is a cross-sectional view taken along a line A-A in FIG. 15.

As shown in FIG. 17, each of the downstream end parts of the independent exhaust passages 401, 402 and 403, in other words, each of the downstream end parts of the first independent exhaust passage 401, the downstream end part of the common passage section 4023 of the second independent exhaust passage 402, and the downstream end part of the third independent exhaust passage 403 has a fan shape in its cross-section corresponding to one-third of a whole circle. Thus, by gathering three of the downstream end parts having such a cross-section, the manifold section 404 having a substantially circular shape as a whole is formed.

Figure 14:
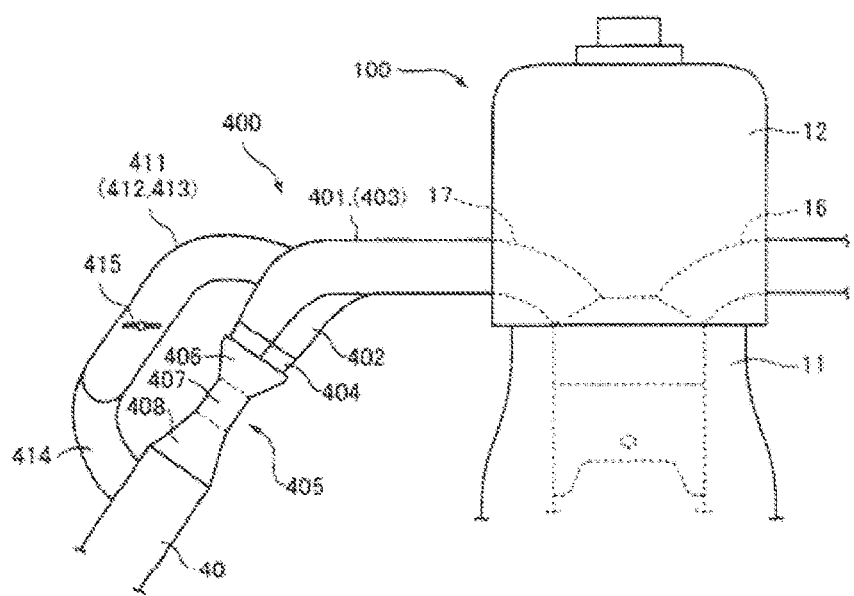
FIG. 14 is a side view showing a configuration of an exhaust manifold of the spark-ignition direct ignition engine shown in FIG. 13.
Figure 15:
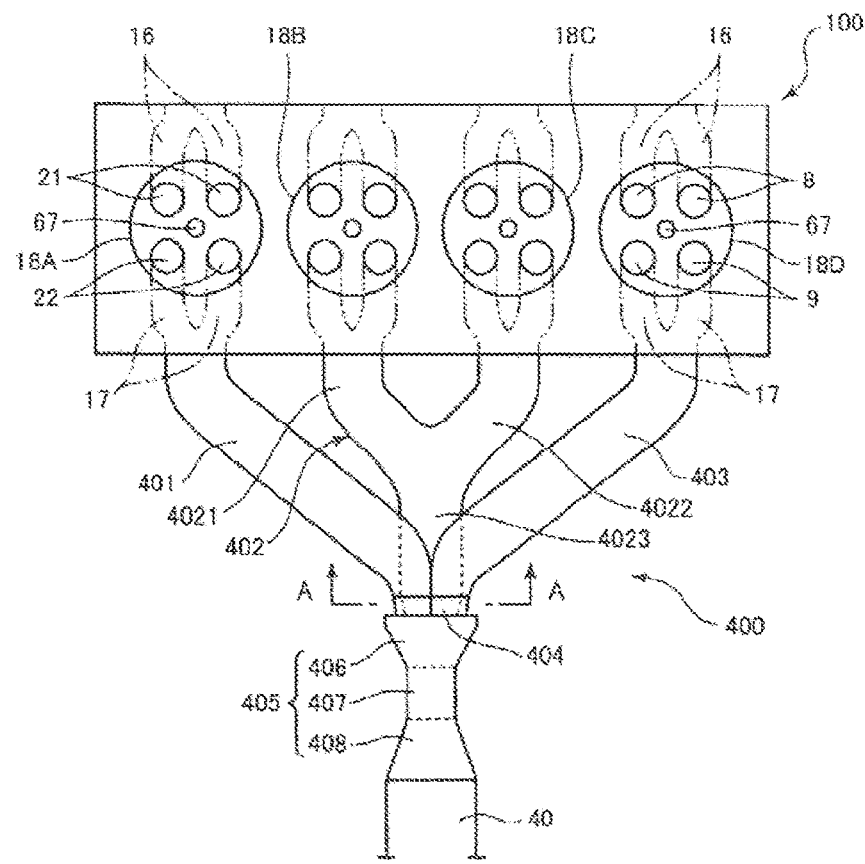
FIG. 15 is a side view showing a configuration of independent exhaust passages provided to the exhaust manifold of the spark-ignition direct ignition engine shown in FIG. 13.

Each of the downstream end parts of the independent exhaust passages 401, 402 and 403 adjacently arranged in the manifold section 404 is formed in a nozzle-shape in which the passage cross-sectional area is smaller toward the downstream end (see FIGS. 14 and 15, etc). Therefore, the exhaust gas passing through the downstream end parts of the independent exhaust passages 401, 402 and 403 is accelerated (in its flow rate) therein and is discharged to the negative pressure generating device 405.

Further, the downstream end parts of the independent exhaust passages 401, 402 and 403 are bundled at an angle such that they are comparatively close to be in parallel with each other. Specifically, the downstream end parts of the independent exhaust passages 401, 402 and 403 are arranged such that each angle between adjacent axes is as narrow as about 10°, for example.

As shown in FIGS. 14 and 15, the negative pressure generating device 405 has, from the upstream side, a nozzle section 406 formed to have a smaller passage cross-sectional area toward the downstream end, a straight section 407 formed to have the substantially uniform passage cross-sectional area, and a diffuser section 408 formed to have a larger passage cross-sectional area toward the downstream end, in this order. Therefore, the exhaust gas discharged from one of the downstream end parts of the independent exhaust passages 401, 402 and 403 flows first into the nozzle section 406 and accelerates therein (here, the pressure of the exhaust gas decreases). Moreover, the exhaust gas accelerated in the nozzle section 406 decelerates as it is passing through the straight section 407 and the diffuser section 408, and the pressure of the exhaust gas recovers thereby.

When the exhaust gas is discharged at a high speed from one of the downstream end parts of the independent exhaust passages 401, 402 and 403 toward the nozzle section 406 of the negative pressure generating device 405, a negative pressure part where the pressure is relatively low is formed around the discharged gas. Therefore, when the exhaust gas is discharged from the independent exhaust passage (one of 401, 402 and 403) of a certain cylinder to the negative pressure generating device 405, a negative pressure acts within the independent exhaust passages of the other cylinders, and the exhaust gas is sucked out downstream therefrom. This is known as the ejector effect.

Note that, when the equivalent circle diameter of the area of the downstream end part of the nozzle part 406 (same as the area of the straight section 407) is "D" and the equivalent circle diameter of the total area of the downstream end parts of the independent exhaust passages 401, 402 and 403 is "a", it has been known that a sufficient ejector effect can be obtained when a/D≥0.5. Therefore, also in this embodiment, a/D is set to 0.5 or higher (e.g., 0.65). Here, the equivalent circle diameter means a diameter when the cross section having a certain shape is replaced with a true circle having the same area.

Figure 16:
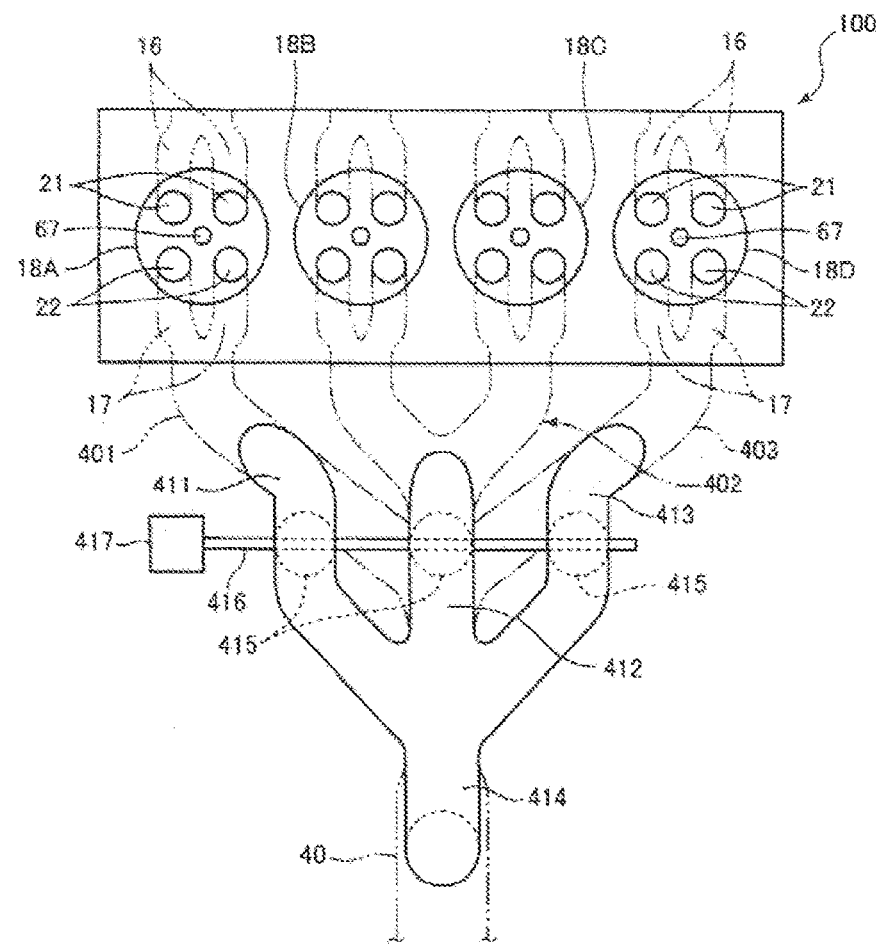
FIG. 16 is a side view showing a configuration of bypass passages provided to the exhaust manifold of the spark-ignition direct ignition engine shown in FIG. 13.

As shown in FIGS. 14 and 16, the exhaust manifold 400 has, in addition to the independent exhaust passages 401, 402 and 403, the negative pressure generating device 405 and the like, three bypass passages 411, 412 and 413 extending branched from intermediate parts of the independent exhaust passages 401, 402 and 403 and merging with each other on the downstream side, and a bypass downstream section 414 extending downstream from the part where the bypass passages 411, 412 and 413 merge with each other. A downstream end part of the bypass downstream section 414 is connected with the exhaust pipe 40 which is the exhaust passage located downstream of the negative pressure generating device 405. In other words, the bypass passages 411, 412 and 413 couple the respective intermediate parts of the independent exhaust passages 401, 402 and 403 (the parts located upstream of the negative pressure generating device 405). Note that, each of the angles from which the bypass passages 411, 412 and 413 merge with each other is set comparatively wide, for example, the intersecting angle between the axes of the bypass passages 411 and 412 and the intersecting angle between the axes of the bypass passages 412 and 413 are respectively set to 30° or wider.

Each of the bypass passages 411, 412 and 413 and the bypass downstream section 414 is set to have a substantially uniform cross-sectional area from the upstream end to the downstream end, and the cross-sectional area is set larger than each cross-sectional area of the downstream parts of the independent exhaust passages 401, 402 and 403. In this embodiment, each cross-sectional area of the bypass passages 411, 412 and 413 and the bypass downstream section 414 is set substantially the same as the circular cross-sectional area of the manifold section 404 where the downstream end parts of the independent exhaust passages 401, 402 and 403 merge with each other (the total area of the downstream end parts of the passages 401, 402 and 403).

Inside each of the bypass passages 411, 412 and 413, an openable flow switch valve 415 is provided to pivot centering on a common rod 416, and one end of the rod 416 is coupled to an actuator 417. When the rod 416 rotates by the operation of the actuator 417, the flow switch valves 415 are simultaneously operated thereby, so as to open and close the bypass passages 411, 412 and 413, respectively.

The flow switch valves 415 for operating as described above are used to switch the state between passing and not passing the exhaust gas discharged from the cylinders 18A to 18D, to the negative pressure generating device 405. For example, when the flow switch valves 415 are fully closed, the exhaust gas discharged from the cylinders 18A to 18D all passes the independent exhaust passages 401, 402 and 403 and flows into the negative pressure generating device 405. In this manner, a high negative pressure (the negative pressure where the pressure is sufficiently decreased) is generated within the negative pressure generating device 405, and a sufficient suction effect of the exhaust gas (ejector effect) can be obtained. On the other hand, when the flow switch valve 415 is fully opened, a major part of the exhaust gas discharged from the cylinders 18A to 18D flows downstream through the bypass passages 411, 412 and 413, and further flows into the exhaust pipe 40 located downstream of the negative pressure generating device 405 without passing through the negative pressure generating device 405. In this manner, the negative pressure in the negative pressure generating device 405 will not be generated, and thus, the ejector effect significantly degrades. Note that, the reason why the major part of the exhaust gas passes the bypass passages 411, 412 and 413 (and not the independent exhaust passages 401, 402 and 403) when the flow switch valve 415 is fully opened is because each of the bypass passages 411, 412 and 413 has a larger cross-sectional area than each of the cross-sectional areas of the downstream end parts of the independent exhaust passages 401, 402 and 403, and has less flow resistance.

Figure 13:
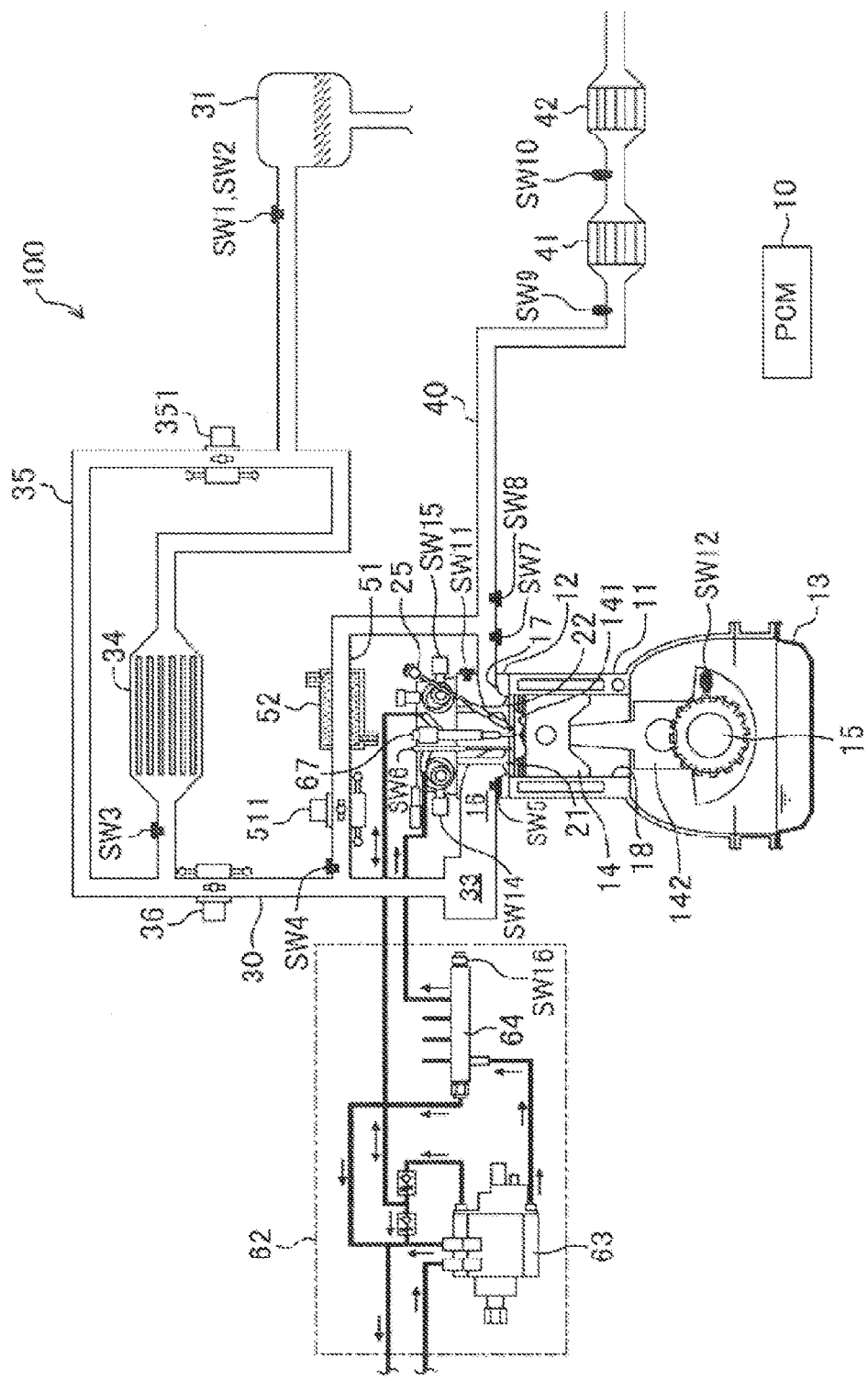
FIG. 13 is a schematic diagram showing a configuration of a spark-ignition direct injection engine different from FIG. 1.
Figure 18:
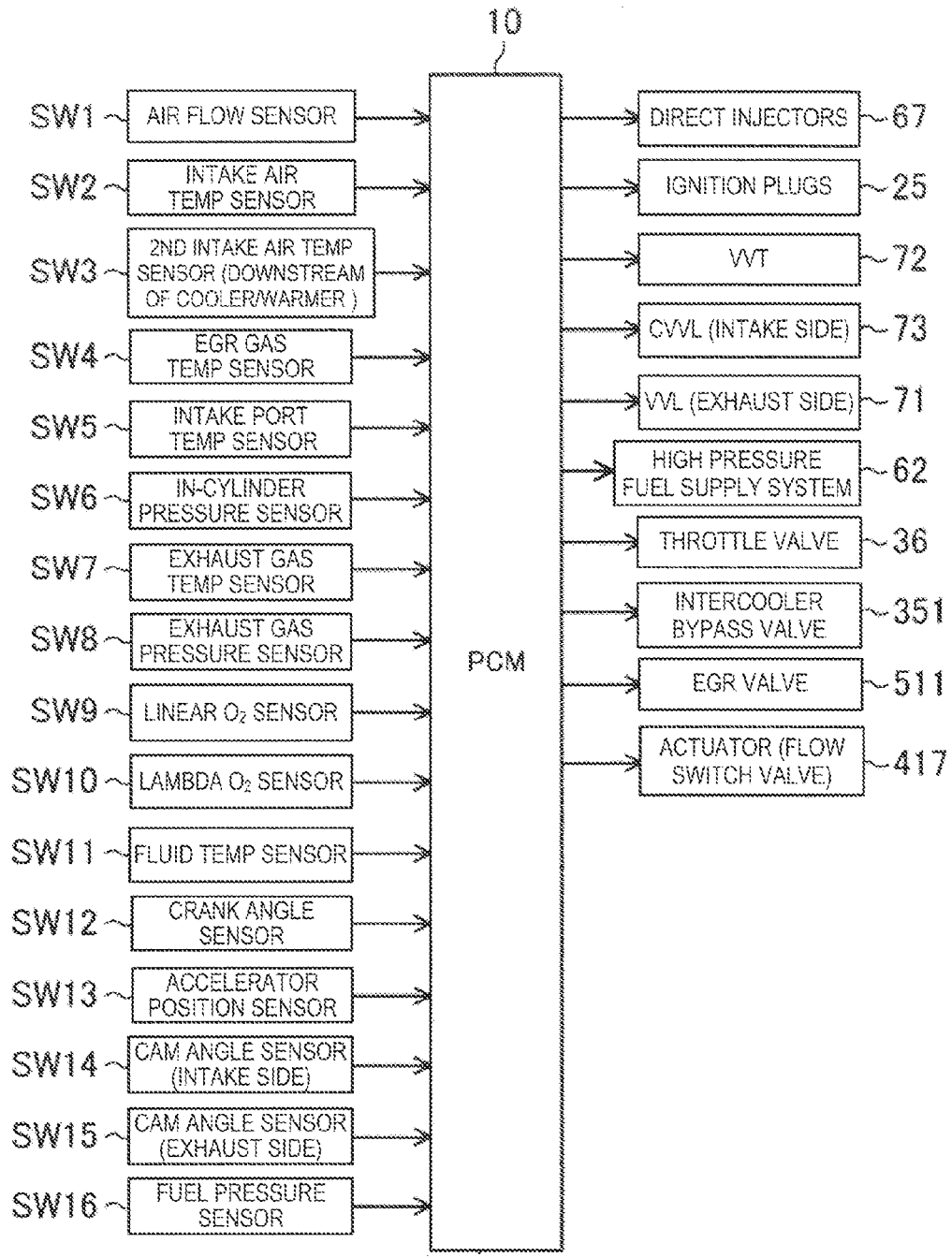
FIG. 18 is a block diagram relating to a control of the spark-ignition direct ignition engine shown in FIG. 13.

By providing the negative pressure generating device 405 and the like in the exhaust system of the engine 100 as described above, although it is described later in detail, the internal EGR ratio can be changed continuously until it becomes zero. Therefore, with the engine 100, the external EGR gas which bypasses the EGR cooler 52 is not required as the hot EGR gas. Thus, as shown in FIG. 13, the EGR cooler bypass passage 53 and the EGR cooler bypass valve 531 are omitted, and only the main passage 51 remains as the EGR passage. Moreover, as shown in FIG. 18, the PCM 10 outputs a control signal to the actuator 417 for adjusting the opening of the flow switch valve 415 instead of outputting the control signal to the EGR cooler bypass valve 531.

Next, the control of the engine 100 having such a configuration is described with reference to FIGS. 19 to 21, which correspond to FIGS. 7 to 9. The part (a) of FIG. 19 shows the gas composition inside the cylinder 18, the part (b) of FIG. 19 shows the in-cylinder temperature in the start of the compression stroke, the part (c) of FIG. 19 shows the oxygen concentration, and the part (d) of FIG. 19 shows the external EGR ratio during the intake, in which the parts (b) and (c) of FIG. 19 are the same as the parts (b) and (c) of FIG. 7.

Figure 19:
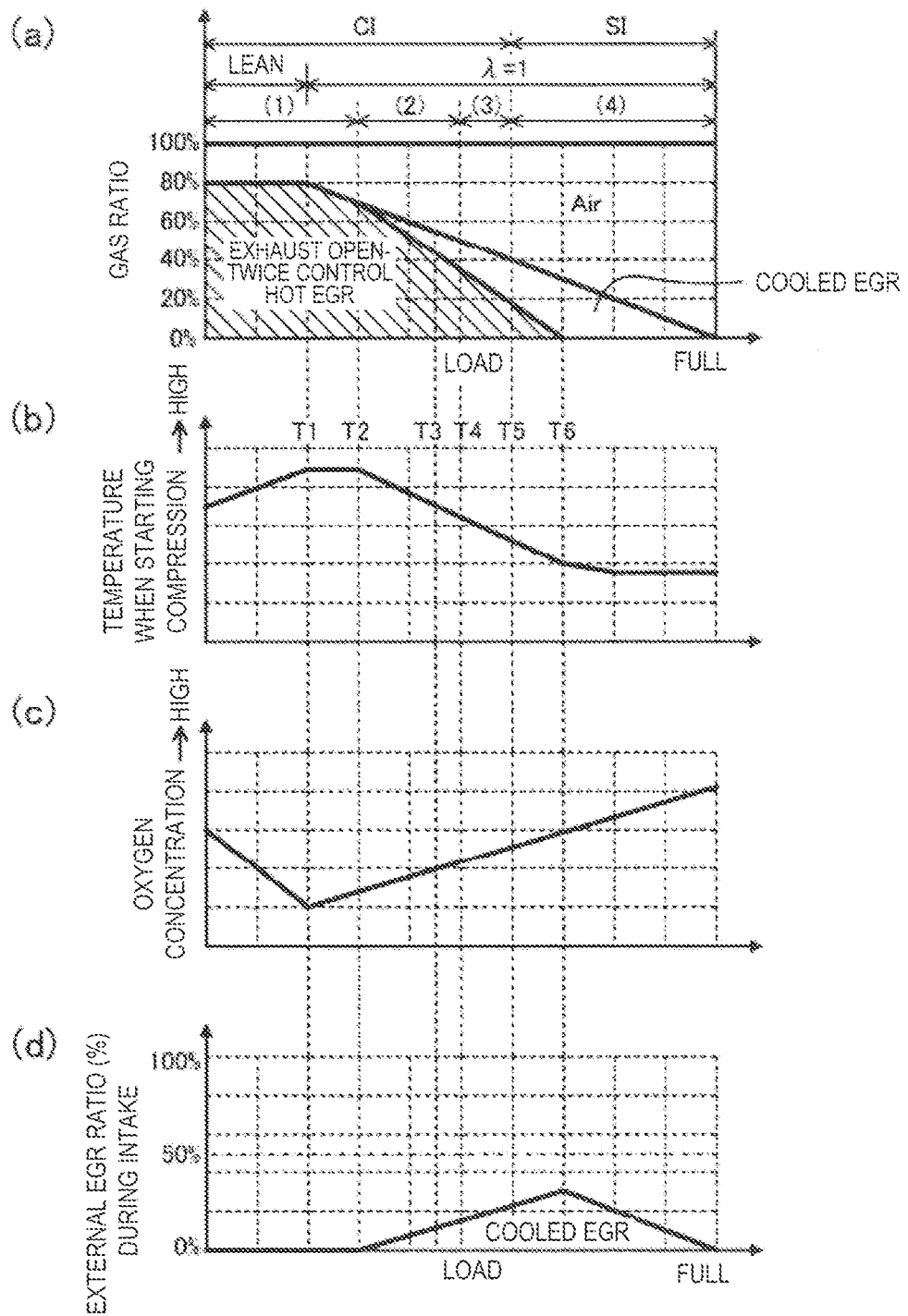
FIG. 19 shows charts illustrating changes of a state inside a cylinder with respect to difference in engine loads in the spark-ignition direct ignition engine shown in FIG. 13, in which the part (a) shows a gas composition inside the cylinder, the part (b) shows a temperature inside the cylinder when starting a compression, the part (c) shows an oxygen concentration, and the part (d) shows an external EGR ratio during the intake.
Figure 20:
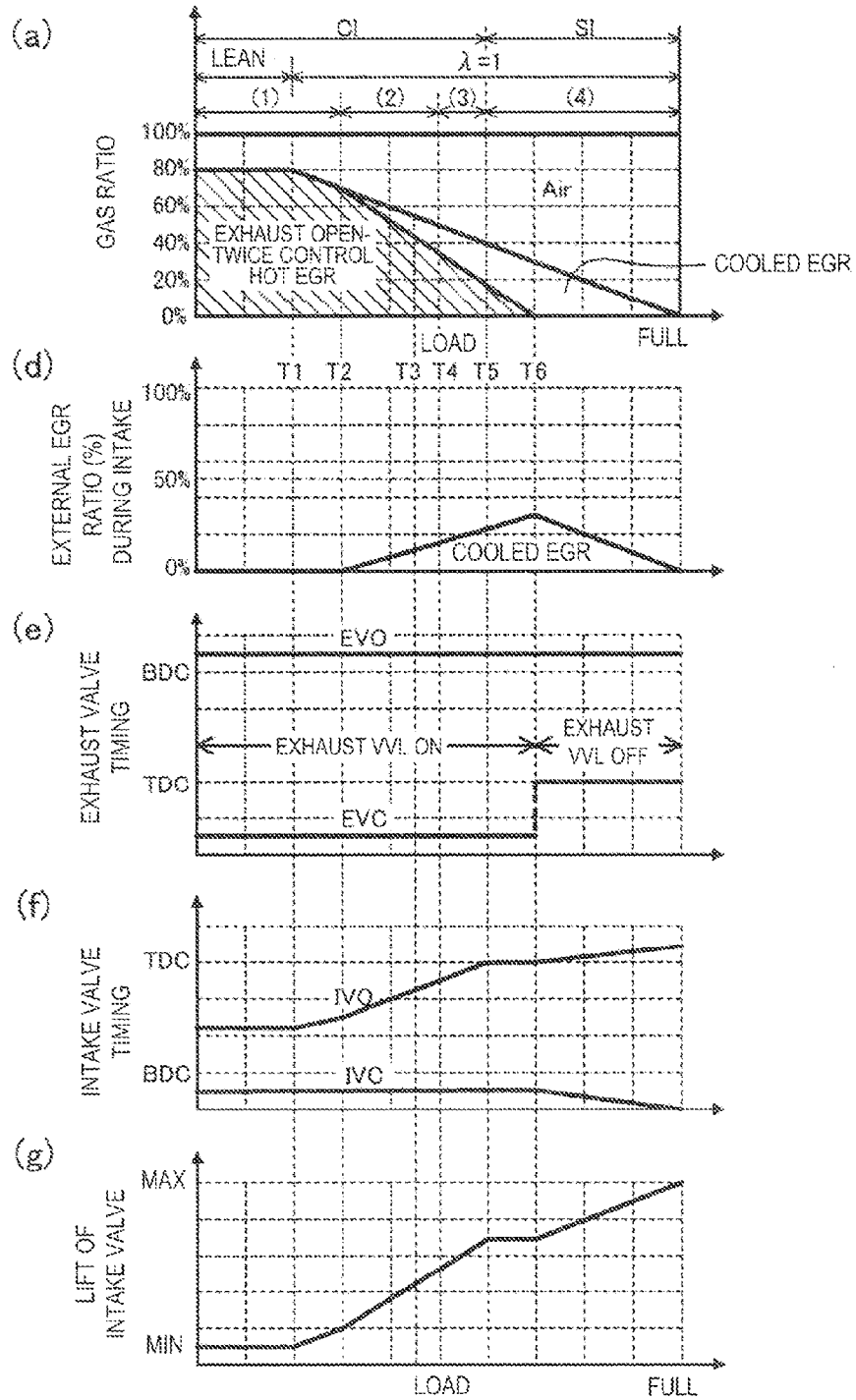
FIG. 20 shows charts illustrating changes of a state inside a cylinder with respect to difference in engine loads in the spark-ignition direct ignition engine shown in FIG. 13, in which the part (a) shows the gas composition inside the cylinder, the part (d) shows the external EGR ratio during the intake, the part (e) shows an exhaust valve timing, the part (f) shows an intake valve timing, and the part (g) shows a lift of the intake valve.

The parts (a) and (d) of FIG. 20 show, similarly to the parts (a) and (d) of FIG. 19, the gas composition inside the cylinder 18 and the external EGR ratio during the intake, respectively. Moreover, in FIG. 20, the part (e) shows the open and close timings of the exhaust valve 22, the part (f) shows the open and close timings of the intake valve 21, and the part (g) shows the lift of the intake valve.

Figure 21:
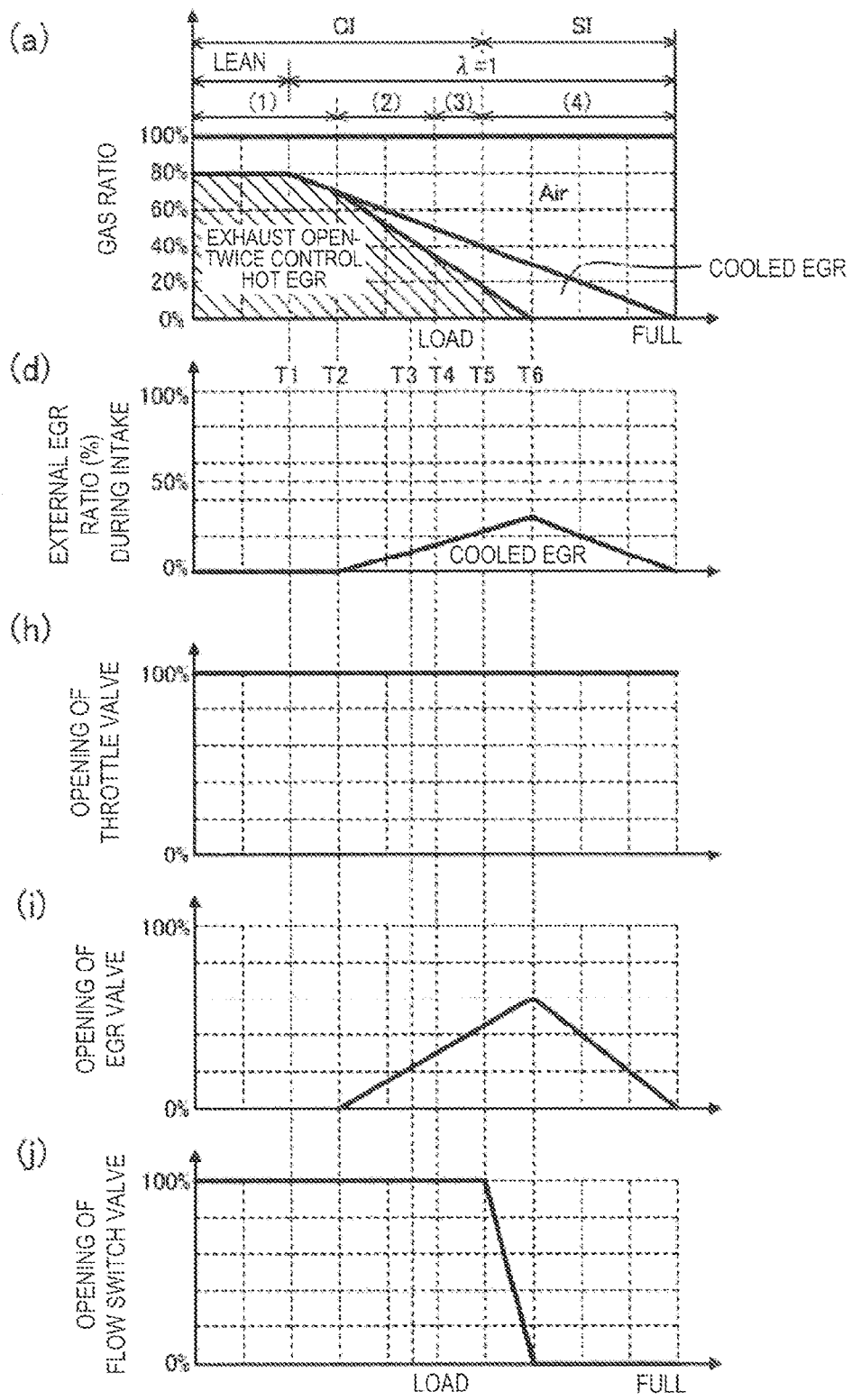
FIG. 21 shows charts illustrating changes of a state inside a cylinder with respect to difference in engine loads in the spark-ignition direct ignition engine shown in FIG. 13, in which the part (a) shows the gas composition inside the cylinder, the part (d) shows the external EGR ratio during the intake, the part (h) shows a throttle opening, the part (i) shows an EGR opening, and the part (j) shows an opening of the flow switch valve.

The parts (a) and (d) of FIG. 21 are the same as the parts (a) and (d) of FIG. 19. Moreover, the part (h) of FIG. 21 shows the opening of the throttle valve 36, the part (i) shows the opening of the EGR valve 511, and the part (j) shows the opening of the flow switch valve 415.

Note that, the control of the engine 100 regarding the fuel injection and the ignition timing is the same as the control of the engine 1 (see the parts (k), (l) and (m) of FIG. 10).

First, between the low load and the predetermined load T2 in the part (a) of FIG. 19 is the same as the part (a) of FIG. 7. Note that, as shown in the part (j) of FIG. 21, the opening of the flow switch valve 415 is set to be fully opened, and thus, the exhaust gas is discharged through one of the bypass passages 411, 412 and 413. In this case, as described later, the suction effect of the exhaust gas discharged to the exhaust port 17 will not be produced, and therefore, a sufficient amount of internal EGR gas can be introduced into the cylinder 18 by the exhaust open-twice control.

Although the exhaust VVL 71 is turned off at the predetermined load T3 (see the part (e) of FIG. 8) in the parts (a) and (e) of FIG. 7, in the parts (a) and (e) of FIG. 20, the exhaust VVL 71 is not turned off even at the predetermined load T3 (see the part (e) of FIG. 20). The exhaust VVL 71 is kept on until the engine load becomes the predetermined load T6 in the SI mode.

Furthermore, as shown in the parts (f) and (g) of FIG. 20, on the higher engine load side than the predetermined load T2, the lift of the intake valve 21 is gradually increased according to the increase of the engine load, and the open timing of the intake valve 21 is advanced accordingly. Thus, as shown in the part (a) of FIG. 19, the introduction amount of the internal EGR gas is gradually reduced according to the increase of the engine load due to the control of the exhaust VVL 71 and the control of the intake CVVL 73. Due to not stopping the operation of the exhaust VVL 71 as described above, the lift of the intake valve 21 is not required to be changed significantly (see the part (g) of FIG. 8). Moreover, the opening of the EGR valve 511 is also not required to be changed significantly as shown in the part (i) of FIG. 21 (see the part (i) of FIG. 9). Thus, the controllability with respect to the increase of the engine load will be improved. Note that, regarding performing the high pressure retarded injection at the engine load above the predetermined load T4, this is the same as described above (see the parts (k), (l) and (m) of FIG. 9).

When the engine load exceeds the predetermined load T5, the switch from the CI mode to the SI mode is performed. On the higher engine load side than the predetermined load T5, as shown in the part (j) of FIG. 21, the opening of the flow switch valve 415 is gradually reduced from the fully opened state. Thus, the exhaust gas amount flowing the bypass passages 411, 412 and 413 is reduced, and the exhaust gas amount flowing into the negative pressure generating device 405 through the independent exhaust passages 401, 402 and 403 increases. This leads to increasing the negative pressure formed within the negative pressure generating device 405 and, since the exhaust gas discharged to the exhaust port 17 is sucked by the increased negative pressure, reducing the amount of the internal EGR gas returned back into the cylinder 18 during the exhaust open-twice control. Specifically, when the negative pressure within the negative pressure generating device 405 is increased (when the pressure is decreased), the negative pressure passes through the independent exhaust passage 401, 402 and 403 to reach the exhaust port 17, and the exhaust gas is sucked downstream. As a result, the occurrence of a phenomenon that the exhaust gas counterflows into the cylinder 18 from the exhaust port 17 becomes less frequent. Since the opening of the flow switch valve 415 is reduced as the engine load increases, the suction effect of the exhaust gas due to the negative pressure generated within the negative pressure generating device 405 (ejector effect) is gradually enhanced. As a result, as shown in the part (a) of FIG. 19, the internal EGR gas amount is gradually reduced.

Thus, at the predetermined load T6 at which the introduction amount of the internal EGR gas is set to zero, as shown in the part (j) of FIG. 21, the opening of the flow switch valve 415 is set to be fully closed and, as shown in the part (e) of FIG. 20, the exhaust VVL 71 is turned off.

The control on the higher engine load side than the predetermined load T6 is basically the same as that shown in, for example, FIG. 7; however, as shown in the part (j) of FIG. 21, the opening of the flow switch valve 415 is kept fully closed until the engine load becomes the full load. Thus, as described above, the entire amount of exhaust gas discharged from the cylinder 18 flows into the negative pressure generating device 405, and the negative pressure generated within the negative pressure generating device 405 increases. On the higher engine load side than the predetermined load T6, although the exhaust open-twice control is stopped, the strong negative pressure is used in sucking (scavenging) the remained gas within the cylinder 18 during the exhaust stroke where the exhaust valve 22 is opened, and contributes in increasing the filling amount of fresh air and decreasing the temperature inside the cylinder 18. This becomes advantageous in increasing the torque within the higher engine load side range.

Note that, the application of the art disclosed herein is not limited to the engine configuration described above. For example, the fuel injection in the intake stroke period may be performed into the intake port 16 by a port injector separately provided in the intake port 16, instead of the injector 67 provided in the cylinder 18.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Further, in the description above, the air-fuel ratio of the mixture gas for the predetermined operating range is set to the theoretical air-fuel ratio ($\lambda \approx 1$); however, the air-fuel ratio of the mixture gas may be set lean. Note that, the setting of the air-fuel ratio to the theoretical air-fuel ratio has an advantage that a three-way catalyst can be used.

The operating ranges shown in FIG. 4 are merely an example, and other various operating ranges may be provided.

Moreover, the high pressure retarded injection may be divided injections as needed. Similarly, the intake stroke injection may also be divided injections as needed. With these divided injections, the fuel may be injected on the intake stroke and the compression stroke.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine (Engine Body)
10 PCM (Controller)
18 Cylinder
25 Ignition Plug
50 EGR Passage (Exhaust Recirculator)
51 Main Passage (Exhaust Recirculator)
511 EGR Valve (Exhaust Recirculator)
52 EGR Cooler (Exhaust Recirculator)
53 EGR Cooler Bypass Passage (Exhaust Recirculator)
531 EGR Cooler Bypass Valve (Exhaust Recirculator)
62 Fuel Supply System (Fuel Pressure Setting Mechanism)
67 Injector (Fuel Injection Valve)
71 VVL (Exhaust Recirculator)

The invention claimed is:

1. A spark-ignition direct injection engine, comprising:
an engine body having a cylinder;
a fuel injection valve for injecting fuel into the cylinder;
a fuel pressure setting mechanism for setting a pressure of the fuel to be injected by the fuel injection valve;
an ignition plug arranged to be oriented toward an inside of the cylinder and for igniting mixture gas within the cylinder; and
a controller for operating the engine body by controlling at least the fuel injection valve, the fuel pressure setting mechanism, and the ignition plug,
wherein when an operating state of the engine body is within a first range that is a predetermined low engine load range, the controller operates the engine body to perform compression-ignition combustion where the mixture gas within the cylinder is compressed to ignite,
wherein when the operating state of the engine body is within a second range where the engine load is higher than the first range where the compression-ignition combustion is performed, the controller controls the ignition plug at a predetermined timing so as to operate the engine body to perform spark-ignition combustion,
wherein when the operating state of the engine body is within a specific high engine load part of the first range including a boundary between the first and second ranges, the controller sets the fuel pressure to be a high fuel pressure of 30 MPa or above by the fuel pressure setting mechanism, and the controller retards the compression ignition to after a compression top dead center by controlling the fuel injection valve to perform the fuel injection into the cylinder at least in a period from a late stage of compression stroke to an early stage of expansion stroke, and
wherein when the operating state of the engine body is within a part of the first range where the engine load is below the specific part, the controller controls the fuel injection valve to perform the fuel injection into the cylinder at least in a period from intake stroke to a middle stage of the compression stroke.

2. The engine of claim 1, further comprising an exhaust recirculator for introducing exhaust gas into the cylinder,
wherein the controller controls the exhaust recirculator to change an EGR ratio, the EGR ratio corresponding to a ratio of an amount of exhaust gas with respect to the entire gas amount within the cylinder,
wherein when the operating state of the engine body is within a lowest engine load part of the first range, the controller sets a highest EGR ratio and reduces the EGR ratio according to an increase of the engine load, and
wherein between the specific part of the first range and a low engine load part of the second range including the boundary between the first and second ranges, the controller continuously reduces the EGR ratio according to the increase of the engine load.

3. The engine of claim 2, wherein the exhaust recirculator introduces into the cylinder, a cooled EGR gas that is cooled exhaust gas, and a hot EGR gas having a higher temperature than the cooled EGR gas, and
wherein when the operating state of the engine body is within the lowest engine load part of the first range, the controller only introduces the hot EGR gas into the cylinder through the exhaust recirculator, and when the operating state of the engine body is within the low engine load part of the second range including the boundary between the first and second ranges, the controller at least introduces the cooled EGR gas into the cylinder.

4. The engine of claim 1, wherein when the operating state of the engine body is within the part of the first range where the engine load is below the specific part, the controller sets the fuel pressure to be a low fuel pressure of below 30 MPa by the fuel pressure setting mechanism, and the controller controls the fuel injection valve to perform the fuel injection at least in the period from intake stroke to the middle stage of the compression stroke.

5. The engine of claim 4, wherein the fuel pressure setting mechanism includes a high pressure fuel pump that is operated by the engine body, and the high pressure fuel pump adjusts the pressure of the fuel to be injected from the fuel injection valve.

6. The engine of claim 1, wherein a piston is reciprocatably inserted into the cylinder, and a concaved cavity is formed on a top face of the piston, and
wherein when the operating state of the engine body is within the specific part of the first range, the controller controls the fuel injection valve to perform the fuel injection into the cylinder at least in the period from the late stage of the compression stroke to the early stage of the expansion stroke so that the fuel is injected into the cavity.

7. The engine of claim 6, wherein the fuel injection valve is a multi-hole type and arranged in a center part of a combustion chamber of the engine body, and the fuel injection valve is set to radially inject the fuel within the cavity in the period from the late stage of the compression stroke to the early stage of the expansion stroke.

8. The engine of claim 2, wherein the exhaust recirculator introduces into the cylinder, a cooled EGR gas that is cooled exhaust gas, and a hot EGR gas having a higher temperature than the cooled EGR gas, and wherein when the operating state of the engine body is between the specific part of the first range and a low engine load part of the second range including the boundary between the first and second ranges, the exhaust recirculator introduces both the cooled and hot EGR gas into the cylinder and, as the engine load increases, reduces the EGR ratio by reducing a ratio of the hot EGR gas amount with respect to the entire gas amount within the cylinder while increasing a ratio of the cooled EGR gas with respect to the entire gas amount within the cylinder, the EGR ratio corresponding to the ratio of the total EGR gas amount including the cooled EGR gas and the hot EGR gas with respect to the entire gas amount within the cylinder.

* * * * *